United States Patent
Feng et al.

(10) Patent No.: US 12,126,881 B2
(45) Date of Patent: *Oct. 22, 2024

(54) SYSTEMS, APPARATUS, AND METHODS FOR GENERATING ENHANCED IMAGES

(71) Applicant: Waymo LLC, Mountain View, CA (US)

(72) Inventors: Jia Feng, Mountain View, CA (US); Damien Kelly, Mountain View, CA (US); Ignacio Garcia Dorado, Mountain View, CA (US); Xiaoying He, Mountain View, CA (US); Benjamin Frevert, Mountain View, CA (US); Nirav Dharia, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,685

(22) Filed: May 25, 2023

(65) Prior Publication Data

US 2023/0370703 A1 Nov. 16, 2023

Related U.S. Application Data

(63) Continuation of application No. 17/550,255, filed on Dec. 14, 2021, now Pat. No. 11,706,507.

(Continued)

(51) Int. Cl.
*H04N 23/45* (2023.01)
*H04N 5/265* (2006.01)
(Continued)

(52) U.S. Cl.
CPC ............. *H04N 23/45* (2023.01); *H04N 5/265* (2013.01); *H04N 23/62* (2023.01); *H04N 23/64* (2023.01); *H04N 23/695* (2023.01)

(58) Field of Classification Search
CPC ........ H04N 23/45; H04N 5/265; H04N 23/62; H04N 23/64; H04N 23/695; H04N 23/73; H04N 23/743; H04N 23/90
See application file for complete search history.

(56) References Cited

U.S. PATENT DOCUMENTS 8,111,300 B2  2/2012  Hwang et al.
9,185,361 B2  11/2015 Curry
(Continued)

FOREIGN PATENT DOCUMENTS

| CN | 110175576 A | 8/2019 |
| WO | 2017058579 A1 | 4/2017 |
| WO | 2019039733 A1 | 2/2019 |

OTHER PUBLICATIONS

W.S. Yoo et al., "Dynamic key-frame selection for enhanced odometry estimation based on laser scan similarity comparison", Electronics Letters, vol. 53, Issue 13, Jun. 26, 2017.

(Continued)

*Primary Examiner* — Ahmed A Berhan
(74) *Attorney, Agent, or Firm* — McDonnell Boehnen Hulbert & Berghoff LLP

(57) ABSTRACT

Described examples relate to an apparatus comprising a first sensor configured to scan an area of interest during a first time period and a second sensor configured to capture a plurality of images of a field of view. The apparatus may include at least one controller configured to receive the plurality of images captured by the second sensor, compare the timestamp information associated with at least one image of the plurality of images to at least one time period of the first time period, and select a base image from the plurality of images based on the comparison.

21 Claims, 8 Drawing Sheets

Related U.S. Application Data

(60) Provisional application No. 63/132,196, filed on Dec. 30, 2020.

(51) Int. Cl.
  *H04N 23/60* (2023.01)
  *H04N 23/62* (2023.01)
  *H04N 23/695* (2023.01)

(56) References Cited

U.S. PATENT DOCUMENTS

| | | | |
|---|---|---|---|
| 9,251,587 B2 | 2/2016 | Friend et al. | |
| 9,931,985 B1 | 4/2018 | Pertsel et al. | |
| 10,078,133 B2 | 9/2018 | Dussan | |
| 10,291,850 B2 | 5/2019 | Bendall et al. | |
| 11,232,685 B1* | 1/2022 | Nixon | H04N 23/60 |
| 11,706,507 B2 | 7/2023 | Feng et al. | |
| 2013/0093906 A1* | 4/2013 | Carlsson | H04N 23/6812 |
| | | | 348/208.99 |
| 2016/0212338 A1* | 7/2016 | Seok | H04N 23/698 |
| 2017/0297488 A1 | 10/2017 | Wang et al. | |
| 2018/0147986 A1* | 5/2018 | Chi | H04N 23/671 |
| 2018/0329066 A1* | 11/2018 | Pacala | G01S 7/4813 |
| 2019/0086514 A1 | 3/2019 | Dussan et al. | |
| 2019/0120948 A1 | 4/2019 | Yang et al. | |
| 2019/0163198 A1 | 5/2019 | Niesen | |
| 2019/0176841 A1 | 6/2019 | Englard et al. | |
| 2019/0227168 A1 | 7/2019 | Low et al. | |
| 2019/0392562 A1 | 12/2019 | Othon | |
| 2020/0014836 A1 | 1/2020 | Das et al. | |
| 2020/0099872 A1 | 3/2020 | Benemann et al. | |
| 2020/0125112 A1 | 4/2020 | Mao et al. | |
| 2020/0404197 A1 | 12/2020 | Gassend et al. | |

OTHER PUBLICATIONS

International Application Serial No. PCT/US2021/063737, Search Report and Written Opinion dated Apr. 11, 2022.

* cited by examiner

SYSTEMS, APPARATUS, AND METHODS FOR GENERATING ENHANCED IMAGES

CROSS-REFERENCE TO RELATED APPLICATIONS

This application is a continuation of U.S. patent application Ser. No. 17/550,255, filed Dec. 14, 2021, which claims priority to U.S. Provisional Patent Application No. 63/132,196, filed Dec. 30, 2020. The foregoing applications are incorporated herein by reference.

BACKGROUND

Vehicles can be configured to operate in an autonomous mode in which the vehicle navigates through an environment with little or no input from a driver. Such autonomous vehicles can include one or more sensors that are configured to detect information about the environment surrounding the vehicle. For example, active sensors, such as light detection and ranging (lidar) sensors, radio detection and ranging (radar) sensors, and sound navigation and ranging (sonar) sensors, can scan an environment by emitting signals toward the environment and detecting reflections of the emitted signals. Passive sensors, such as image sensors and microphones, can detect signals originating from sources in the environment. The vehicle and its associated computer-implemented control systems may use the information detected by the sensors to navigate through the environment.

A lidar sensor can scan an environment by emitting signals toward the environment and detecting reflections of the emitted signals. The lidar sensor may be configured to determine distances to environmental features while scanning through a scene to assemble a cloud of point positions indicative of the three-dimensional shape of the environmental scene. Individual points are measured by generating laser pulses and detecting returning pulses, if any, reflected from an environmental object, and determining the distance to the reflective object according to the time delay between the emitted pulses and the reception of the reflected pulses. The laser pulses can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. A three-dimensional map of points of reflective features may be generated based on the returning pulses for the entire scanning zone. The three-dimensional point map thereby indicates positions of reflective objects in the scanned scene.

An image sensor can capture an image of a scene viewable to the image sensor. For instance, the image sensor may include an array of complementary metal oxide semiconductor (CMOS) sensing elements or other types of light sensing elements. Each CMOS sensing element may receive a portion of light from the scene incident on the array. Each CMOS sensing element may then output a measure of the amount of light incident on the CMOS sensing element during an exposure time when the CMOS sensing element is exposed to the light from the scene. With this arrangement, an image (e.g., a frame) of the scene can be generated, where each pixel in the image indicates one or more values (e.g., colors, etc.) based on outputs from the array of CMOS sensing elements.

SUMMARY

Systems, methods, and apparatus for generating enhanced image frames are disclosed. In one aspect, the present application describes an apparatus comprising a first sensor configured to scan an area of interest during a first time period and a second sensor configured to capture a plurality of images of a field of view. At least one controller is configured to receive the plurality of images captured by the second sensor, compare the timestamp information associated with at least one image of the plurality of images to at least one time period of the first time period, and select a base image from the plurality of images based on the comparison In another aspect, the present application describes a method comprising causing, by a computing device, a first sensor to scan an area of interest during a first time period, receiving, by the computing device, a plurality of images captured by a second sensor, comparing, by the computing device, the timestamp information associated with at least one of the plurality of images to at least one time period of the first time period, selecting, by the computing device, a base image from the plurality of images based on the comparison.

In still another aspect, a non-transitory computer-readable medium storing instructions is disclosed that, when the instructions are executed by one or more processors, causes the one or more processors to perform operations. The operations may include causing a first sensor to scan an area of interest during a first time period, receiving a plurality of images captured by a second sensor, comparing the timestamp information associated with at least one of the plurality of images to at least one time period of the first time period, and selecting a base image from the plurality of images based on the comparison.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1:
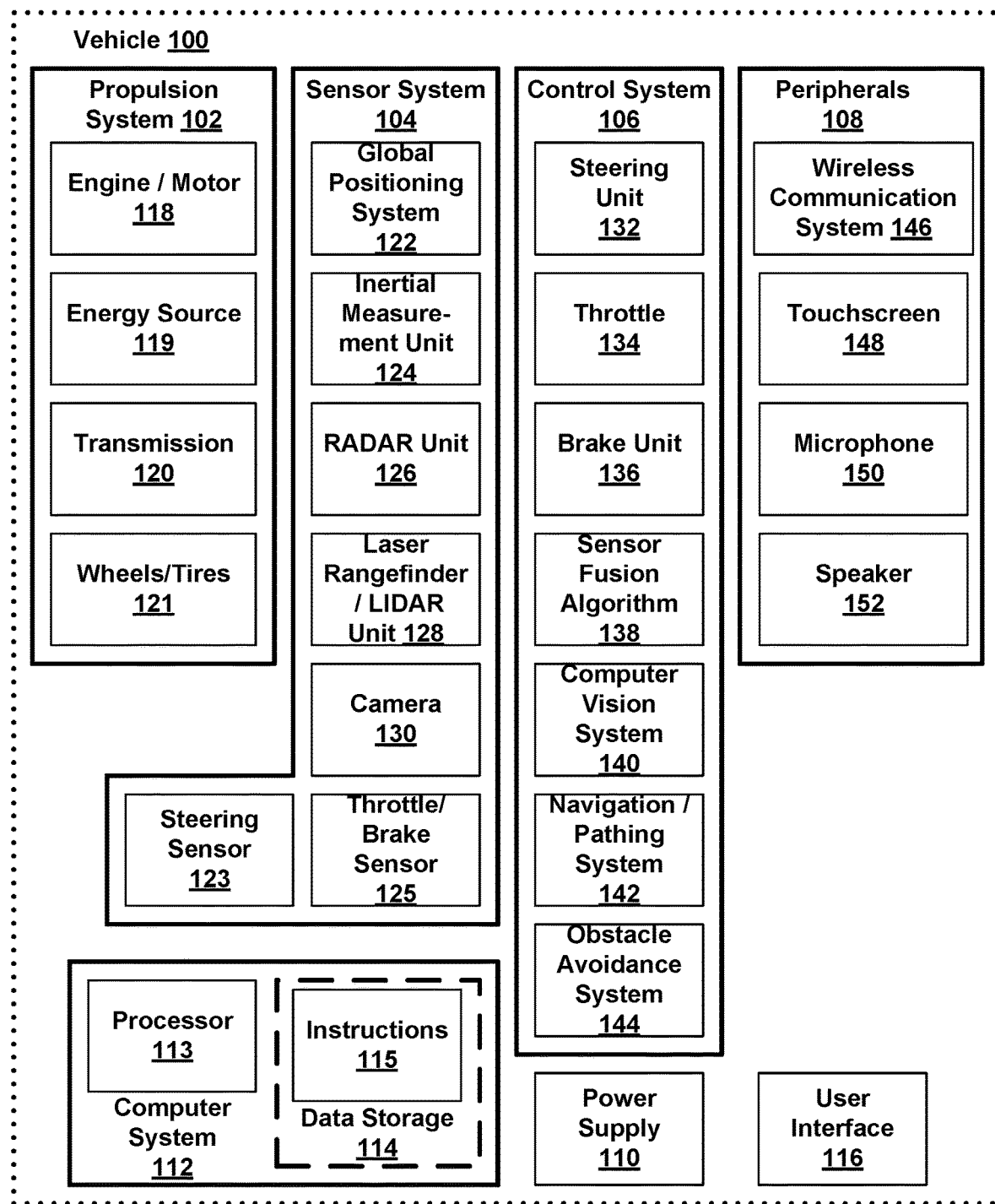
FIG. 1 is a functional block diagram illustrating systems of a vehicle, according to an example implementation.

Example systems, apparatus, and methods are described herein. It should be understood that the words "example," "exemplary," and "illustrative" are used herein to mean "serving as an example, instance, or illustration." Any implementation or feature described herein as being an "example," "exemplary," and/or "illustrative" is not necessarily to be construed as preferred or advantageous over other implementations or features. Thus, other embodiments can be utilized and other changes can be made without departing from the scope of the subject matter presented herein.

Accordingly, the example embodiments and implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

The present disclosure provides systems, apparatus, and methods that improve the functioning of computer systems of autonomous vehicles by generating enhanced images (e.g., enhanced sensor frames) of a scene of an environment. The enhanced images may be formed by combining or merging a plurality of images captured by a sensor over a time period. A base image (e.g., a key image) may be selected from the plurality of images based on the alignment or synchronization of the base image with sensor data captured by one or more other sensors. The plurality of images may be merged into the base image to construct an enhanced image (e.g. an enhanced image frame). The enhanced image may enable the computing systems of the vehicle to improve the detection of objects (e.g., obstacles) and its trajectory and/or route planning. Further, the computing systems of the vehicle may be able to accurately align (or otherwise associate) the enhanced image with sensor data from other sensors to achieve accurate multi-modal sensor fusion, sensor calibration, 3D reconstruction, multimodal calibration, and the like.

Autonomous vehicles may navigate a path of travel without requiring a driver to provide guidance and control. It should be understood that autonomous vehicles may be fully autonomous or partially autonomous. In a partially autonomous vehicle, some functions may be manually controlled (e.g., by a person or driver) some or all of the time. Further, a partially autonomous vehicle could be configured to switch between a fully-manual operation mode and a partially or fully autonomous operation mode. In some embodiments, a vehicle may be equipped with an advanced driver assistance system that may automate certain driving tasks and/or assist a driver in controlling the vehicle.

In order to ensure safe travel, obey traffic regulations, and avoid obstacles in the environment, the vehicle may utilize data provided by a vehicle sensor system equipped with one or multiple types of sensors configured to capture sensor data associated with the vehicle's environment. For example, the sensors may include light detection and ranging (lidar) sensors, radio detection and ranging (radar) sensors, sound navigation and ranging (sonar) sensors, image sensors (e.g., cameras), microphone sensors, and other suitable sensors.

As the vehicle navigates, the sensors of the vehicle sensor system may be configured to capture sensor information (e.g., measurements) indicative of the vehicle's environment and provide the sensor information periodically or in a continuous manner to a computing device of a vehicle sensor system. The sensors may provide the sensor information in various formats to the computing device. For example, the computing device may receive the sensor information from the sensor in the form of sensor data frames with each frame containing one or multiple measurements of the environment at particular times of operation by the sensors. Further, the sensors may provide multiple sensor data frames (e.g., a series of sensor frames) to the computing device as the vehicle operates, which may reflect changes in the environment.

The sensor system of the vehicle may include a first sensor to scan an area of interest (e.g., a scene of an environment). The first sensor may be configured to transmit light signals within a field of view (e.g., a scanning range) of the first sensor and capture reflected light signals. In one implementation, the first sensor may include an active sensor (e.g., a lidar sensor) configured to scan an area nearby the vehicle and provide frames of sensor data (e.g., lidar data) containing measurements related to objects in the area to the computing device. Other types of sensors may be configured to capture information about the objects in the environment and provide the information to the computing device of the vehicle sensor system as well.

The sensor system of the vehicle may also include a second sensor (e.g., an image sensor or camera) configured to capture a series of sensor data frames (e.g., images) of a field of view associated with the second sensor. The field of view associated with the second sensor may overlap with the field of view of the first sensor. The second sensor may include a plurality of sensing elements configured in horizontal rows and/or vertical columns. The sensing elements of the second sensor may be sampled to obtain image data (e.g., images). In some examples, the second sensor may have a rolling shutter configured to iteratively sample or scan the vertical columns and/or horizontal rows of the sensing elements. Once the second sensor captures the image data from the sensing elements, the second sensor may provide the image data in the form of sensor data frames (e.g., images) to the computing device.

In some examples, one or more of the operations of the sensors of the vehicle sensor system may be synchronized. For example, the computing device of the sensor system may synchronize the data capture operations of the sensors. As such, the sensor data captured by the first sensor may be synchronized or aligned with the sensor data captured by the second sensor. By synchronizing the sensor data captured by the sensors, the computing device may be able to identify sensor data that is captured by each of the sensors of the vehicle at substantially the same time. The computing device may also be able to accurately associate (e.g., temporally and/or spatially) and/or compare the sensor data captured by the first sensor with sensor data captured by the second sensor. Further, the synchronization or alignment of the sensor data may enable the computing device of the sensor system to determine that the sensor data captured by the first sensor and the second sensor are associated with one another when the sensor data is received, which may reduce the amount of processing required for determining associations between the sensor data.

In some examples, the computing device of the sensor system can synchronize one or more capture times (e.g., capture time and/or exposure times) of the second sensor (e.g., image sensor) with capture or sampling times (e.g., detection times) of the first sensor (e.g., a lidar sensor). For example, the first sensor and the second sensor may be configured to capture sensor data when the first sensor is substantially aligned with the center of the field of view of the second sensor. Further, in some implementations, the computing device of the sensor system may synchronize the field of views of the first and second sensors. For example, the computing device may cause the first and second sensor to capture sensor data when a field of view associated with the first sensor overlaps at least a portion of the field of view associated with the second sensor. Further, the first and second sensors may capture sensor data when an orientation (e.g., a viewing or pointing direction) of the first sensor is substantially aligned with a center portion of the field of view associated with the second sensor. The sensor data captured by the first and second sensors may be provided to the computing device of the vehicle sensor system in the form of sensor data frames (e.g. images).

The computing device of the sensor system may be configured to receive the sensor data frames (e.g., images and lidar data) from the first and second sensors. The computing device may receive the sensor data frames at different frame rates from the sensors. Each sensor data frame may be indicative of the environment at a particular time period when the associated sensor captured the sensor data within the sensor data frame. As such, the computing device may determine information about the environment using the sensor data frames received from one or more sensors.

In some examples, the sensor data frames may include information indicating timing information (e.g., a timestamp), sensor information, external conditions (e.g., time of the day, temperature, distance to other objects, etc., capture information (e.g., exposure time, motion information, gains, etc.) and information indicating an order of the sensor data frames within a set of sensor data frames. For example, a sensor data frame may include information that indicates the time of capture of the sensor data frame (e.g., an image) by a sensor and/or information that associates the sensor data frame with a particular type of sensor. In other examples, the sensor data frames may include other information as well.

In some examples, the computing device of the vehicle sensor system may generate time information (e.g., timestamps) and associate the time information with each of the sensor data frames from the sensors. For example, the computing device may generate timestamps for each sensor data frame or data point generated by the first sensor (e.g., a lidar sensor) and may generate timestamps for each sensor data frame or image frame generated by the second sensor (e.g., an image sensor). In some examples, the computing device may generate a timestamp for each line of an image (e.g., a row of image pixels).

The computing device may be configured to receive multiple sensor data frames corresponding to a time period during which the sensors capture the frames. In some examples, the computing device may receive a set or series of sensor data frames (e.g., images) from the second sensor (e.g., image sensor) over a period of time as the vehicle navigates. Within the series of frames, the initial sensor data frame (e.g., first frame) may include sensor data (i.e., image data) that corresponds to the environment at a first time period. Similarly, the second sensor data frame of the set may include sensor data that corresponds to the environment at a subsequent time period after the first time period. The set of sensor data frames may provide matching or similar information about the environment and/or may include other information depending on the amount of time that passes between the capture of the sensor data frames by the sensor. As such, the computing device may receive measurements and other information based on previously detected objects or new objects as the vehicle continues to operate.

In some examples, the set of sensor data frames (e.g., images) received by the computing device can be combined or synthesized into a payload image frame (e.g., an output image) or series of payload image frames. For example, the computing device may combine two or more sensor data frames of the set of sensor data frames (e.g., images) into a single payload image frame (e.g., a high dynamic range (HDR) image). Combining the sensor data frames into a single payload image frame (e.g., a composite image) may include performing one or more image processing techniques on the set of sensor data frames (e.g., based on temporal information within the set of frames). Such image processing techniques may improve the signal-to-noise ratio (SNR) of and achieve HDR within the resulting payload image frame.

In some implementations, the image processing techniques for processing the set of sensor data frames may include a selection of a base or key frame (e.g., a base image) from the set of sensor data frames (e.g., images). In some examples, the base frame may be selected from the set of sensor data frames by identifying the sensor data frame with the greatest sharpness or the sensor data frame that was captured during the least amount of motion (e.g., based on metadata associated with each of the frames).

In some examples, the computing device of the sensor system may use timestamps associated with the data sensor frames in order to determine which sensor data frame should be used as a base frame (e.g., a base image) for downstream image processing on a set of sensor data frames captured by a sensor. For example, the computing device may select a base frame from a set of sensor data frames by comparing the timestamps associated with each of the sensor data frames to the capture or sampling times (e.g., detection times) of a sensor. Once the base frame is selected, the other sensor data frames may be cropped, enhanced, or otherwise modified based on the base frame and then the set of frames may be synthesized into the base frame to form a payload image frame (e.g., a composite or output image).

In some examples, a base frame (e.g., an image) may be selected from a set of sensor data frames based on the capture or sampling times of the sensors and/or the orientations of the sensors. For example, the sensor data frame of the set of sensor data frames that is closest in time to when the first and second sensors capture or sample sensor data may be selected as the base frame. Further, when the first and second sensors capture the sensor data, the first sensor may have an orientation that is substantially aligned with the center of a field of view of the second sensor. As such, the base frame may be half-exposed at the time when the orientation of the first sensor is aligned with the center of the field of view of the second sensor. The base frame may be half exposed when half of the field of view associated with the second sensor (e.g., image sensor) is exposed according to a shutter location of the second sensor and half of the field of view remains to be exposed by the shutter of the second sensor. As a result, the synchronization error between the sensor data of the first sensor (e.g., a lidar sensor) and the data of the second sensor (e.g., an image sensor) may be minimized (e.g. may be zero).

In addition to combining a set of images based on a base frame, the computing system may associate sensor data captured by the sensors based on the timing information. For example, the sensor data frames (e.g., sensor data) generated by the first sensor (e.g., a lidar sensor) may be compared with sensor data frames (e.g., sensor data) generated by the second sensor based on timestamps associated with the sensor data of the sensor data frame. The computing devices may combine (e.g., fuse or merge) the associated sensor data of the sensors based on the comparison. The sensor system may use the combined sensor data frames to control the path of the vehicle and/or to make determinations about the location and identity of objects in the surrounding environment.

Example systems, apparatus, and methods that implement the techniques described herein will now be described in greater detail with reference to the figures. Generally, an example system may be implemented in or may take the form of a sensor or computer system of an automobile. However, a system may also be implemented in or take the form of other systems for vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating systems of an example vehicle 100, which may be configured to operate fully or partially in an autonomous mode. More specifically, the vehicle 100 may operate in an autonomous mode without human interaction through receiving control instructions from a computing system. As part of operating in the autonomous mode, the vehicle 100 may use one or more sensors to detect and possibly identify objects of the surrounding environment to enable safe navigation. In some implementations, the vehicle 100 may also include subsystems that enable a driver to control operations of the vehicle 100.

As shown in FIG. 1, the vehicle 100 may include various subsystems, such as a propulsion system 102, a sensor system 104, a control system 106, one or more peripherals 108, a power supply 110, a computer or computing system 112, a data storage 114, and a user interface 116. In other examples, the vehicle 100 may include more or fewer subsystems, which can each include multiple elements. The subsystems and components of the vehicle 100 may be interconnected in various ways. In addition, functions of the vehicle 100 described herein can be divided into additional functional or physical components, or combined into fewer functional or physical components within implementations. For instance, the control system 106 and computer system 112 may be combined into a single system that operates the vehicle 100 in accordance with various operations.

The propulsion system 102 may include one or more components operable to provide powered motion for the vehicle 100 and can include an engine/motor 118, an energy source 119, a transmission 120, and wheels/tires 121, among other possible components. For example, the engine/motor 118 may be configured to convert the energy source 119 into mechanical energy and can correspond to one or a combination of an internal combustion engine, an electric motor, steam engine, or Stirling engine, among other possible options. For instance, in some implementations, the propulsion system 102 may include multiple types of engines and/or motors, such as a gasoline engine and an electric motor.

The energy source 119 represents a source of energy that may, in full or in part, power one or more systems of the vehicle 100 (e.g., an engine/motor 118). For instance, the energy source 119 can correspond to gasoline, diesel, other petroleum-based fuels, propane, other compressed gas-based fuels, ethanol, solar panels, batteries, and/or other sources of electrical power. In some implementations, the energy source 119 may include a combination of fuel tanks, batteries, capacitors, and/or flywheels.

The transmission 120 may transmit mechanical power from the engine/motor 118 to the wheels/tires 121 and/or other possible systems of the vehicle 100. As such, the transmission 120 may include a gearbox, a clutch, a differential, and a drive shaft, among other possible components. A drive shaft may include axles that connect to one or more of the wheels/tires 121.

The wheels/tires 121 of the vehicle 100 may have various configurations within example implementations. For instance, the vehicle 100 may exist in a unicycle, bicycle/motorcycle, tricycle, or car/truck four-wheel format, among other possible configurations. As such, the wheels/tires 121 may connect to the vehicle 100 in various ways and can exist in different materials, such as metal and rubber.

The sensor system 104 can include various types of sensors or sensor devices, such as a Global Positioning System (GPS) 122, an inertial measurement unit (IMU) 124, a radar 126, a laser rangefinder/lidar sensor 128, a camera 130, a steering sensor 123, and a throttle/brake sensor 125, among other possible sensors. In some implementations, the sensor system 104 may also include sensors configured to monitor internal systems of the vehicle 100 (e.g., $O_2$ monitor, fuel gauge, engine oil temperature, brake wear).

The GPS 122 may include a transceiver operable to provide information regarding the position of vehicle 100 with respect to the Earth. The IMU 124 may have a configuration that uses one or more accelerometers and/or gyroscopes and may sense position and orientation changes of vehicle 100 based on inertial acceleration. For example, the IMU 124 may detect a pitch and yaw of the vehicle 100 while the vehicle 100 is stationary or in motion.

The radar 126 may represent one or more systems configured to use radio signals to sense objects, including the speed and heading of the objects, within the local environment of the vehicle 100. As such, the radar 126 may include antennas configured to transmit and receive radio signals. In some implementations, the radar 126 may correspond to a mountable radar unit or system configured to obtain measurements of the surrounding environment of the vehicle 100.

The laser rangefinder/lidar 128 may include one or more laser sources, a laser scanner, and one or more detectors or sensors, among other system components, and may operate in a coherent mode (e.g., using heterodyne detection) or in an incoherent detection mode. In some embodiments, the one or more detectors or sensor of the laser rangefinder/lidar 128 may include one or more photodetectors. In some examples, the photodetectors may be capable of detecting single photon avalanche diodes (SPAD). Further, such photodetectors can be arranged (e.g., through an electrical connection in series) into an array (e.g., as in a silicon photomultiplier (SiPM)).

The camera 130 may include one or more devices (e.g., a still camera or video camera) configured to capture images of the environment of the vehicle 100. In some examples, the camera may include an image sensor configured to capture a series of images (e.g., image frames) in a time-sequential manner. The image sensor may capture images at a particular rate or at a particular time interval between successive frame exposures.

The steering sensor 123 may sense a steering angle of the vehicle 100, which may involve measuring an angle of the steering wheel or measuring an electrical signal representative of the angle of the steering wheel. In some implementations, the steering sensor 123 may measure an angle of the wheels of the vehicle 100, such as detecting an angle of the wheels with respect to a forward axis of the vehicle 100. The steering sensor 123 may also be configured to measure a combination (or a subset) of the angle of the steering wheel, electrical signal representing the angle of the steering wheel, and the angle of the wheels of the vehicle 100.

The throttle/brake sensor 125 may detect the position of either the throttle position or brake position of the vehicle 100. For instance, the throttle/brake sensor 125 may measure the angle of both the gas pedal (throttle) and brake pedal or may measure an electrical signal that could represent, for instance, an angle of a gas pedal (throttle) and/or an angle of a brake pedal. The throttle/brake sensor 125 may also measure an angle of a throttle body of the vehicle 100, which may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of the vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of the vehicle 100. In other implementations, the throttle/brake sensor 125 may be configured to measure a pressure applied to a pedal of the vehicle, such as a throttle or brake pedal.

The control system 106 may include components configured to assist in navigating the vehicle 100, such as a steering unit 132, a throttle 134, a brake unit 136, a sensor fusion algorithm 138, a computer vision system 140, a navigation/pathing system 142, and an obstacle avoidance system 144. More specifically, the steering unit 132 may be operable to adjust the heading of the vehicle 100, and the throttle 134 may control the operating speed of the engine/motor 118 to control the acceleration of the vehicle 100. The brake unit 136 may decelerate vehicle 100, which may involve using friction to decelerate the wheels/tires 121. In some implementations, brake unit 136 may convert kinetic energy of the wheels/tires 121 to electric current for subsequent use by a system or systems of the vehicle 100.

The sensor fusion algorithm 138 of the control system 106 may include a Kalman filter, Bayesian network, or other algorithms that can process data from the sensor system 104. In some implementations, the sensor fusion algorithm 138 may provide assessments based on incoming sensor data, such as evaluations of individual objects and/or features, evaluations of a particular situation, and/or evaluations of potential impacts within a given situation.

The computer vision system 140 of the control system 106 may include hardware and software operable to process and analyze images in an effort to determine objects, environmental objects (e.g., stop lights, road way boundaries, etc.), and obstacles. As such, the computer vision system 140 may use object recognition, Structure From Motion (SFM), video tracking, and other algorithms used in computer vision, for instance, to recognize objects, map an environment, track objects, estimate the speed of objects, etc.

The navigation/pathing system 142 of the control system 106 may determine a driving path for the vehicle 100, which may involve dynamically adjusting navigation during operation. As such, the navigation/pathing system 142 may use data from the sensor fusion algorithm 138, the GPS 122, and maps, among other sources to navigate the vehicle 100. The obstacle avoidance system 144 may evaluate potential obstacles based on sensor data and cause systems of the vehicle 100 to avoid or otherwise negotiate the potential obstacles.

As shown in FIG. 1, the vehicle 100 may also include peripherals 108, such as a wireless communication system 146, a touchscreen 148, a microphone 150, and/or a speaker 152. The peripherals 108 may provide controls or other elements for a user to interact with the user interface 116. For example, the touchscreen 148 may provide information to users of the vehicle 100. The user interface 116 may also accept input from the user via the touchscreen 148. The peripherals 108 may also enable the vehicle 100 to communicate with devices, such as other vehicle devices.

The wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

The vehicle 100 may include the power supply 110 for powering components. The power supply 110 may include a rechargeable lithium-ion or lead-acid battery in some implementations. For instance, the power supply 110 may include one or more batteries configured to provide electrical power. The vehicle 100 may also use other types of power supplies. In an example implementation, the power supply 110 and the energy source 119 may be integrated into a single energy source.

The vehicle 100 may also include the computer system 112 to perform operations, such as operations described therein. As such, the computer system 112 may include at least one processor 113 (which could include at least one microprocessor) operable to execute instructions 115 stored in a non-transitory computer readable medium, such as the data storage 114. In some implementations, the computer system 112 may represent a plurality of computing devices that may serve to control individual components or subsystems of the vehicle 100 in a distributed fashion.

In some implementations, the data storage 114 may contain instructions 115 (e.g., program logic) executable by the processor 113 to execute various functions of the vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during the operation of the vehicle 100 in the autonomous, semi-autonomous, and/or manual modes.

The vehicle 100 may include the user interface 116 for providing information to or receiving input from a user of the vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., the propulsion system 102, the sensor system 104, and the control system 106), as well as from the user interface 116. For example, the computer system 112 may utilize input from the sensor system 104 in order to estimate the output produced by the propulsion system 102 and the control system 106. Depending upon the implementation, the computer system 112 could be operable to monitor many aspects of the vehicle 100 and its subsystems. In some implementations, the computer system 112 may disable some or all functions of the vehicle 100 based on signals received from the sensor system 104.

The components of the vehicle 100 could be configured to work in an interconnected fashion with other components within or outside their respective systems. For instance, in an example implementation, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of the GPS 122 and the features recognized by the computer vision system 140 may be used with map data stored in the data storage 114 to determine specific road parameters. Further, the radar unit 126 may also provide information about the surroundings of the vehicle. In other words, a combination of various sensors (which could be termed input-indication and output-indication sensors) and the computer system 112 could interact to provide an indication of an input provided to control a vehicle or an indication of the surroundings of a vehicle.

In some implementations, the computer system 112 may make a determination about various objects based on data that is provided by systems other than the radio system. For example, the vehicle 100 may have lasers or other optical sensors configured to sense objects in a field of view of the sensors (e.g., vehicle). The computer system 112 may use the outputs from the various sensors to determine information about objects in a field of view of the vehicle, and may determine distance and direction information to the various objects. The computer system 112 may also determine whether objects are desirable or undesirable based on the outputs from the various sensors.

Although FIG. 1 shows various components of the vehicle 100, i.e., the wireless communication system 146, the computer system 112, the data storage 114, and the user interface 116, as being integrated into the vehicle 100, one or more of these components could be mounted or associated separately from the vehicle 100. For example, the data storage 114 could, in part or in full, exist separate from the vehicle 100. Thus, the vehicle 100 could be provided in the form of device elements that may be located separately or together. The device elements that make up the vehicle 100 could be communicatively coupled together in a wired and/or wireless fashion.

Figure 2:
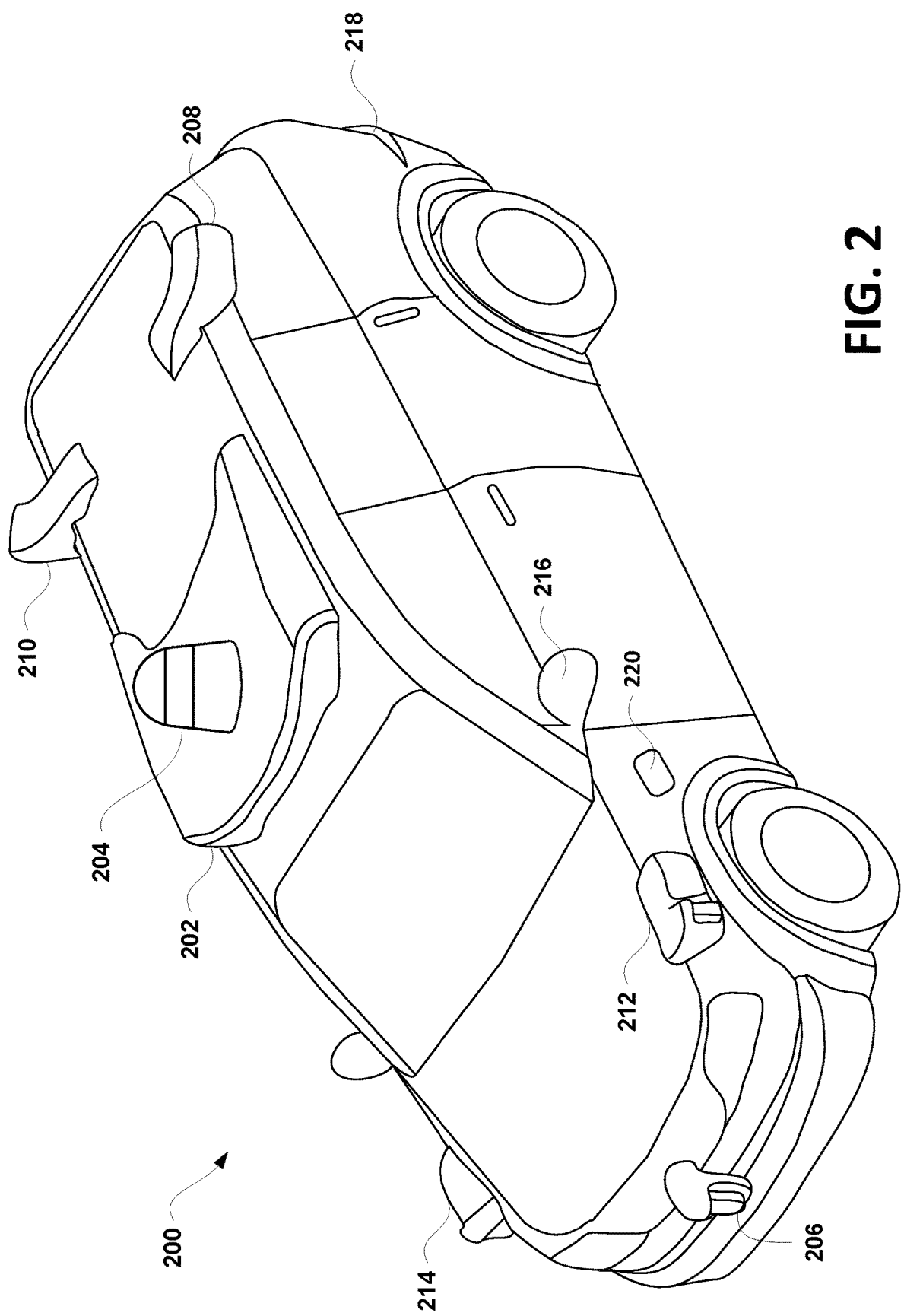
FIG. 2 is a conceptual illustration of a physical configuration of a vehicle, according to an example implementation.

FIG. 2 shows an example vehicle 200 that can include some or all of the functions described in connection with vehicle 100 in reference to FIG. 1. Although vehicle 200 is illustrated in FIG. 2 as a four-wheel car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor system having a sensor unit 202, a first lidar sensor 204, a second lidar sensor 206, a first radar sensor 208, a second radar sensor 210, a first lidar/radar sensor 212, a second lidar/radar sensor 214, a third radar sensor 220, and two additional locations 216, 218 at which a radar sensor, a lidar sensor, a laser rangefinder sensor, and/or other type of sensor or sensor(s) could be located on the vehicle 200. Each of the first and second lidar/radar sensors 212 and 214 can take the form of a lidar sensor, a radar sensor, or both. Additionally, another radar sensor may be included on the opposite side of the vehicle from radar sensor 220. The vehicle 200 may include one or more other components in addition to or instead of those shown.

Furthermore, the example vehicle 200 can include any of the components described in connection with vehicle 100 of FIG. 1. The first, second, and third radar sensors 208, 210, and 220 and/or the first and second lidar sensors 204 and 206 can actively scan the surrounding environment for the presence of potential obstacles and can be similar to the laser rangefinder/lidar sensor 128 in the vehicle 100. Additionally, the first lidar/radar sensor 212 and second lidar/radar sensor 214 can actively scan the surrounding environment for the presence of potential obstacles and can be similar to the radar sensor 126 and/or laser rangefinder/lidar sensor 128 in the vehicle 100.

In some examples, the lidar sensor may be one of two different types of lidar sensors. A first type of lidar sensor may be a lidar sensor that rotates and can continuously scan the full region of the lidar sensor's field of view. A second type of lidar sensor may be a lidar sensor that can rotate and be steered to scan a specific region of the lidar sensor's field of view. The first type of lidar sensor may have a shorter range than the second type of lidar sensor. The second type of lidar sensor may have a smaller field of view when operating compared to the first lidar sensor. In some examples, one or more of the designated lidar sensors of vehicle 200 may contain one or both types of lidar sensors. For example, lidar sensor 204 mounted on the top of the vehicle may contain both types of lidar sensors. In one example, the second type of lidar sensor may have a field of view that is 8-degrees wide in the horizontal plane and 15-degrees wide in the vertical plane.

The sensor unit 202 is mounted atop the vehicle 200 and includes one or more sensors configured to detect information about an environment surrounding the vehicle 200 and output indications of the detected information. For example, the sensor unit 202 can include any combination of cameras, radar sensors, lidar sensors, range finder sensors, and acoustic sensors. The sensor unit 202 can include one or more movable mounts that could be operable to adjust the orientation of the one or more sensors in the sensor unit 202. In one embodiment, the movable mount could include a rotating platform that could rotate sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, although other mounting locations are possible. Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In some examples, one of the sensors of the sensor unit 202 may include a camera or image capture device. The camera may be configured to capture images of the environment of the vehicle 200. In some examples, the camera may capture images from a forward-looking view with respect to the vehicle 200, but other mounting locations (including movable mounts) and viewing angles of the camera are possible within implementations. In other examples, the camera may contain both optical cameras (i.e., cameras that capture human-visible light) and infrared cameras. Infrared cameras may be able to capture images of heat within the camera's field of view. Additionally, a camera (not shown) can be mounted inside a front windshield of the vehicle 200.

In another example, one of the sensors of the sensor unit 202 may include a lidar sensor or device. The lidar sensor may be configured to transmit an electromagnetic signal (e.g., light, such as that from a gas or diode laser, or other possible light source) that may be reflected by target objects near the vehicle. The lidar sensor may be configured to capture the reflected electromagnetic (e.g., laser) signals. The captured reflected electromagnetic signals may enable the computing device or sensor system to determine a range to various objects. The computing device or sensor system may also be able to determine a velocity or speed of target objects and store it as environment data.

In another example, one of the sensors of the sensor unit may include a radar sensor or device. The radar sensor may be configured to transmit an electromagnetic signal that will be reflected by various objects near the vehicle, and then capture electromagnetic signals that reflect off the objects. The captured reflected electromagnetic signals may enable a computer device or sensor system (or processing system) to make various determinations about objects that reflected the electromagnetic signal. For example, the distance and position to various reflecting objects may be determined. In some implementations, the vehicle may have more than one radar sensor in different orientations. The radar sensor may be configured to store captured information to a memory for later processing by a processing system of the vehicle. The information captured by the radar sensor may be environmental data.

Additionally, in an example, one of the sensors of the sensor unit 202 may include a microphone. The microphone may be configured to capture audio of the environment surrounding the vehicle. Sounds captured by the microphone may include emergency vehicle sirens and the sounds of other vehicles. For example, the microphone may capture the sound of the siren of an emergency vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

Referring still to FIG. 2, the first and second radar sensors 208 and 210 can be located near the rear of the vehicle 200 and can actively scan the region in back of the vehicle 200 for the presence of radio-reflective objects. Similarly, the first lidar/radar sensor 212 and the second lidar/radar sensor 214 may be mounted near the front of the vehicle to actively scan a region in front of the vehicle. A radar sensor can be situated, for example, in a location suitable to illuminate a region including a forward-moving path of the vehicle 200 without occlusion by other features of the vehicle 200. For example, a radar sensor can be situated to be embedded and/or mounted in or near the front bumper, front headlights, cowl, and/or hood, etc. Furthermore, one or more additional radar sensors can be located to actively scan the side and/or rear of the vehicle 200 for the presence of radio-reflective objects, such as by including such devices in or near the rear bumper, side panels, rocker panels, and/or undercarriage, etc.

In practice, each radar sensor may be able to scan over a 90-degree beamwidth. When radar sensors are placed at the corners of the vehicle, as shown by radar units 208, 210, 212, and 214, each radar sensor may be able to scan a 90-degree field of view in the horizontal plane and provide the vehicle with a radar field of view of the full 360-degree area around the vehicle. Further, the vehicle may also include two side-facing radar sensors, one shown as radar unit 220 (and the second not shown on the opposite side of the vehicle from radar unit 220). The side-facing radar units may be able to provide further radar imaging when other radar sensors are obstructed, such as when making a protected right hand turn (i.e., a right-hand turn when there's another vehicle in the lane to the left of the turning vehicle).

Although not shown in FIG. 2, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices (e.g., mobile devices) in a vehicular communication system or a roadway station. Examples of such vehicular communication systems include dedicated short-range communications (DSRC), radio frequency identification (RFID), and other proposed communication standards directed towards intelligent transport systems.

A control system of the vehicle 200 may be configured to control the vehicle 200 in accordance with a control strategy from among multiple possible control strategies. The control system may be configured to receive information from sensors (e.g., sensor units) coupled to the vehicle 200 (on or off the vehicle 200), modify the control strategy (and an associated driving behavior) based on the information, and control the vehicle 200 in accordance with the modified control strategy. The control system may be further configured to monitor the information received from the sensors and continuously evaluate driving conditions. Further, the control system may be configured to modify the control strategy and driving behavior based on changes in the driving conditions.

Figure 3:
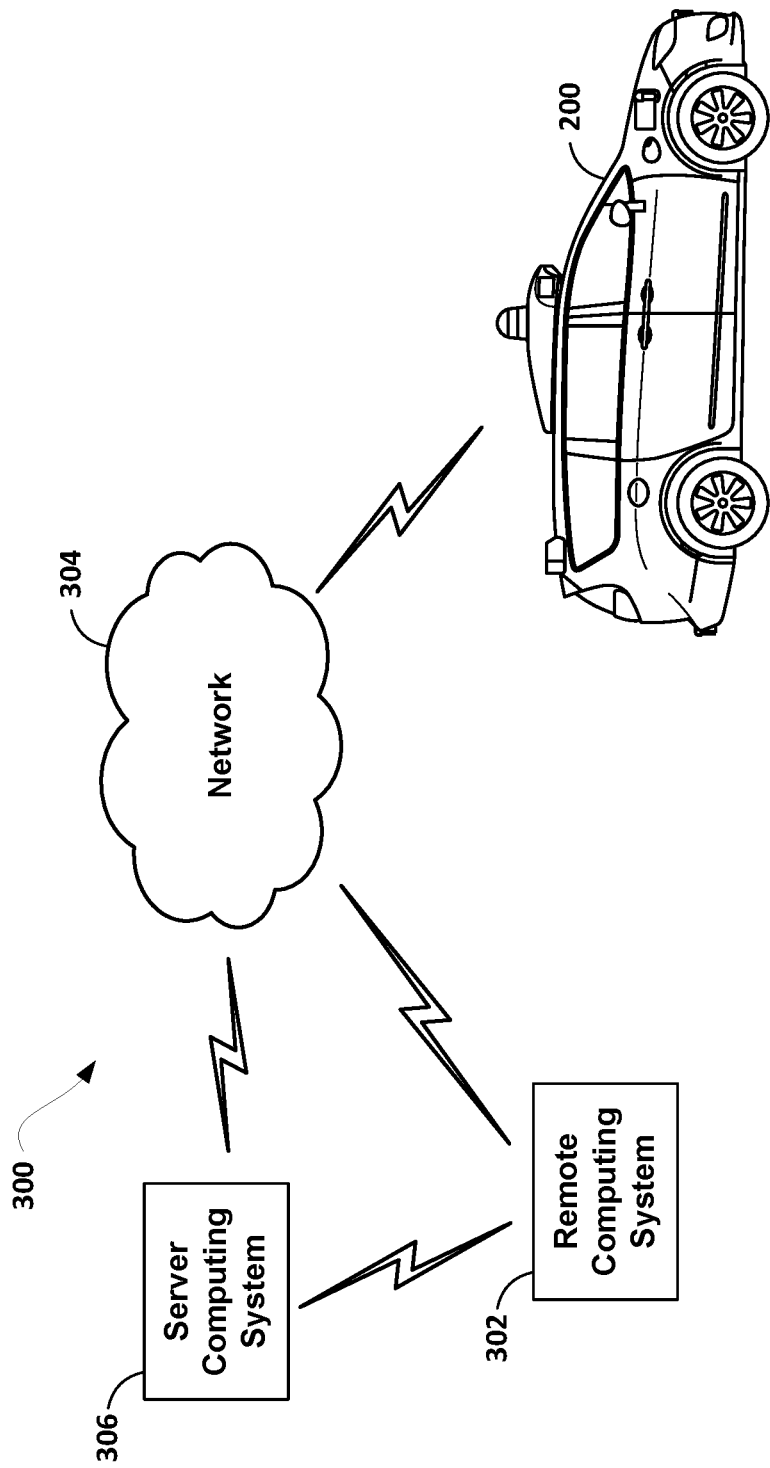
FIG. 3 is a conceptual illustration of wireless communication between various computing systems related to an autonomous vehicle, according to an example implementation.

FIG. 3 is a conceptual illustration of wireless communication between various computing systems related to an autonomous vehicle, according to an example implementation. In particular, wireless communication may occur between a remote computing system 302 and the vehicle 200 via a network 304. Wireless communication may also occur between a server computing system 306 and the remote computing system 302, and between the server computing system 306 and the vehicle 200.

The vehicle 200 can correspond to various types of vehicles capable of transporting passengers or objects between locations and may take the form of any one or more of the vehicles discussed above. In some instances, the vehicle 200 may operate in an autonomous mode that enables a control system to safely navigate the vehicle 200 between destinations using sensor measurements. When operating in an autonomous mode, the vehicle 200 may navigate with or without passengers. As a result, the vehicle 200 may pick up and drop off passengers between desired destinations.

The remote computing system 302 may represent any type of device related to remote assistance techniques, including but not limited to those described herein. Within examples, the remote computing system 302 may represent any type of device configured to (i) receive information related to the vehicle 200, (ii) provide an interface through which a human operator can in turn perceive the information and input a response related to the information, and (iii) transmit the response to vehicle 200 or to other devices. The remote computing system 302 may take various forms, such as a workstation, a desktop computer, a laptop, a tablet, a mobile phone (e.g., a smart phone), and/or a server. In some examples, the remote computing system 302 may include multiple computing devices operating together in a network configuration.

The remote computing system 302 may include one or more subsystems and components similar or identical to the subsystems and components of vehicle 200. At a minimum, the remote computing system 302 may include a processor configured for performing various operations described herein. In some implementations, the remote computing system 302 may also include a user interface that includes input/output devices, such as a touchscreen and a speaker. Other examples are possible as well.

The network 304 represents infrastructure that enables wireless communication between the remote computing system 302 and the vehicle 200. The network 304 also enables wireless communication between the server computing system 306 and the remote computing system 302, and between the server computing system 306 and the vehicle 200.

The position of the remote computing system 302 can vary within examples. For instance, the remote computing system 302 may have a remote position from the vehicle 200 that has wireless communication via the network 304. In another example, the remote computing system 302 may correspond to a computing device within the vehicle 200 that is separate from the vehicle 200, but with which a human operator can interact while a passenger or driver of the vehicle 200. In some examples, the remote computing system 302 may be a computing device with a touchscreen operable by the passenger of the vehicle 200.

In some implementations, operations described herein that are performed by the remote computing system 302 may be additionally or alternatively performed by the vehicle 200 (i.e., by any system(s) or subsystem(s) of the vehicle 200). In other words, the vehicle 200 may be configured to provide a remote assistance mechanism with which a driver or passenger of the vehicle can interact.

The server computing system 306 may be configured to wirelessly communicate with the remote computing system 302 and the vehicle 200 via the network 304 (or perhaps directly with the remote computing system 302 and/or the vehicle 200). The server computing system 306 may represent any computing device configured to receive, store, determine, and/or send information relating to the vehicle 200 and the remote assistance thereof. As such, the server computing system 306 may be configured to perform any operation(s), or portions of such operation(s), that is/are described herein as performed by the remote computing system 302 and/or the vehicle 200. Some implementations of wireless communication related to remote assistance may utilize the server computing system 306, while others may not.

The server computing system 306 may include one or more subsystems and components similar or identical to the subsystems and components of the remote computing system 302 and/or the vehicle 200, such as a processor configured for performing various operations described herein, and a wireless communication interface for receiving information from, and providing information to, the remote computing system 302 and the vehicle 200.

The various systems described above may perform various operations. For example, a computing or sensor system (e.g., the remote computing system 302, the server computing system 306, or a computing system local to the vehicle 200) may operate sensors or sensor devices to capture sensor information of the environment of an autonomous vehicle. In general, at least one computing device or system will be able to analyze the sensor information and possibly control the autonomous vehicle.

In some implementations, to facilitate autonomous operation, a vehicle (e.g., the vehicle 200) may receive data representing objects in an environment in which the vehicle operates (also referred to herein as "environment data") in a variety of ways. A sensor or computing system on the vehicle may provide the environment data representing objects of the environment. For example, the vehicle may have various sensors, including a camera, a radar sensor, a laser range finder/lidar sensor, an image sensor, a microphone, and other sensors. Each of these sensors may communicate data to a computing device (e.g., a processor) in the vehicle about information each respective sensor receives.

In some implementations, the computing device (e.g., a controller or processor) or computing system may be able to combine information from the various sensors in order to make further determinations of the environment of the vehicle. For example, the processing system may combine data from a lidar sensor or a radar sensor and an image sensor to determine if another vehicle or pedestrian is in front of the autonomous vehicle. In other implementations, other combinations of sensor data may be used by the computing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The computing or processing system of the vehicle may alter the control of the vehicle based on the environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this operation, the vehicle may analyze the environment data representing objects of the environment to determine at least one object having a detection confidence below a threshold. A computing device or processor in the vehicle may be configured to detect various objects of the environment based on environment data from various sensors. For example, in one implementation, the computing device may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some implementations, the environment data may be received from a camera and include image or video data. In other implementations, the environment data may be received from a lidar sensor. The vehicle may analyze the captured image or video data to identify objects in the image or video data. The methods and apparatuses may be configured to monitor image and/or video data for the presence of objects of the environment. In other implementations, the environment data may be radar, audio, or other data. The vehicle may be configured to identify objects of the environment based on the radar, audio, or other data.

In some implementations, the techniques the vehicle uses to detect objects may be based on a set of known data. For example, data related to environmental objects may be stored to a memory located in the vehicle. The vehicle may compare received data to the stored data to determine objects. In other implementations, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other implementations, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some implementations, the vehicle may react as if the detected object is present despite the low confidence level. In other implementations, the vehicle may react as if the detected object is not present.

When the vehicle detects an object of the environment, it may also calculate a confidence associated with the specific detected object. The confidence may be calculated in various ways depending on the implementation. In one example, when detecting objects of the environment, the vehicle may compare environment data to predetermined data relating to known objects. The closer the match between the environment data to the predetermined data, the higher the confidence. In other implementations, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some implementations, via a server (e.g., server computing system 306). The human operator of the remote computing system may in turn use the environment data as a basis for responding to the request.

In some implementations, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other implementations, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
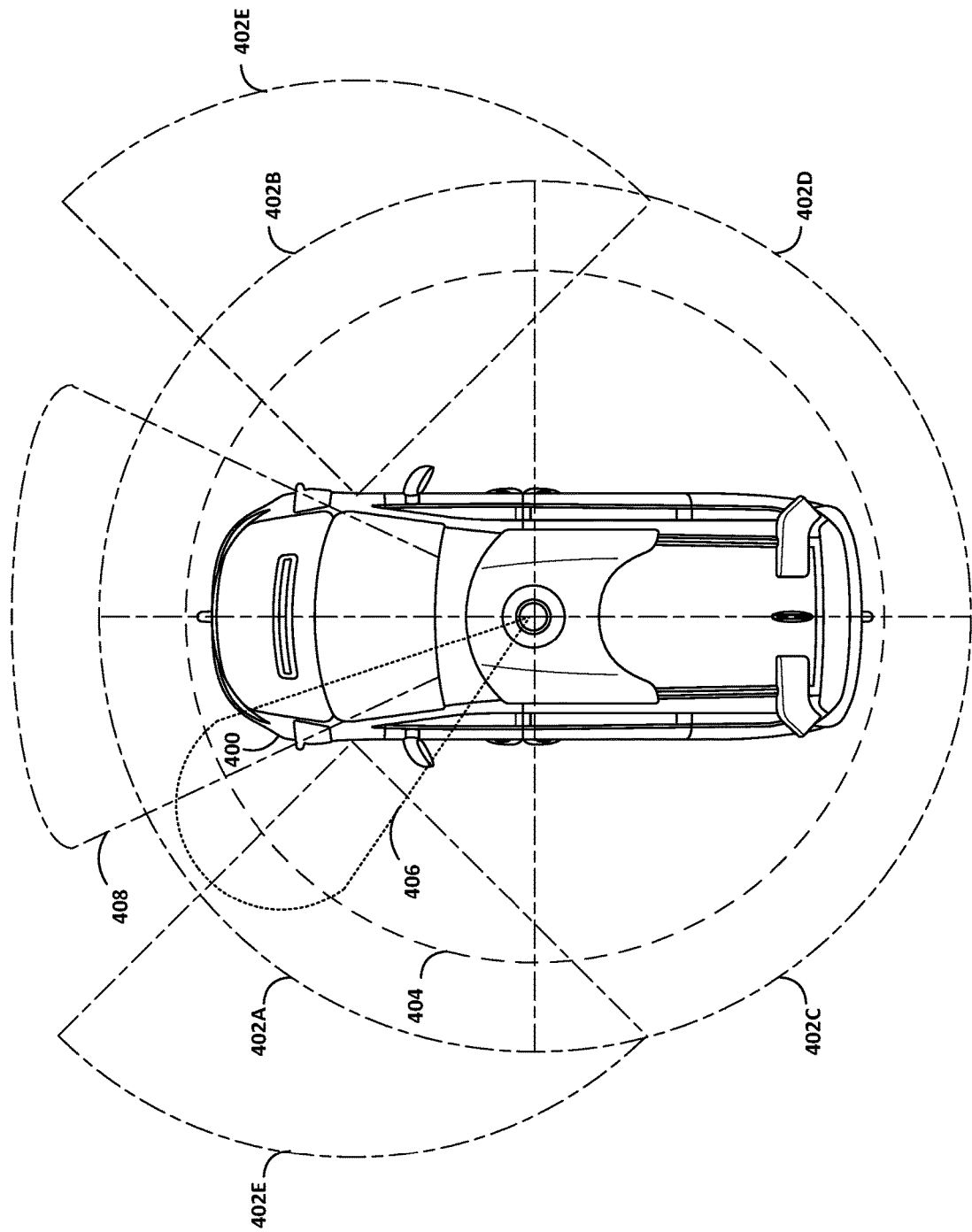
FIG. 4 is a conceptual illustration of an imaging operation of an example apparatus.

FIG. 4 illustrates an example autonomous vehicle 400 having various sensor fields of view (e.g., scanning ranges). As previously discussed with respect to FIG. 2, a vehicle 400 may contain a plurality of sensors or sensor devices. The locations of the various sensors may correspond to the locations of the sensors described in reference to FIG. 2. Alternatively, the sensors may have other locations. The locations of the sensors are omitted from FIG. 4 for simplicity of the drawing. For each sensor of the vehicle 400, FIG. 4 shows a respective field of view. The field of view of a sensor may include an angular region over which the sensor unit may detect objects and a detection range that corresponds to maximum distance from the sensor unit at which the sensor may detect objects.

As previously disclosed, the vehicle 400 may include six radar sensors, two lidar sensors, and a camera. The first radar sensor may be located on the front-left of the vehicle and have an angular field of view corresponding to the angular portion of field of view 402A. The second radar sensor may be located on the front-right of the vehicle and have an angular field of view corresponding to the angular portion of field of view 402B. The third radar sensor may be located on the rear-left of the vehicle and have an angular field of view corresponding to the angular portion of field of view 402C. The fourth radar sensor may be located on the rear-right of the vehicle and have an angular field of view corresponding to the angular portion of field of view 402D. The fifth radar sensor may be located on the right side of the vehicle and have an angular field of view corresponding to the angular portion of field of view 402E. The sixth radar sensor may be located on the left side of the vehicle and have an angular field of view corresponding to the angular portion of field of view 402E. Each of the six radar sensors may be configured with a scannable beamwidth of 90 degrees. A radar beam width may be smaller than 90 degrees, but each radar sensor may be able to steer the radar beam across the 90-degree field of view.

The first lidar sensor of the vehicle 400 may be configured to scan the full 360-degree region around the vehicle as shown by an angular field of view corresponding to the angular portion of field of view 404. The second lidar sensor of the vehicle 400 may be configured to scan the region smaller than the 360-degree region around the vehicle. In one example, the second lidar sensor may have an 8-degree field of view in the horizontal plane as shown by an angular field of view corresponding to the angular portion of field of view 406.

The camera of the vehicle may be configured to capture still images and/or video. The camera may be an optical camera and/or an infrared camera. The camera may have an angular field of view corresponding to the angular portion of field of view 408.

In addition to the field of view for each of the various sensors of vehicle 400, each sensor may also have a corresponding detection range. In one example, the detection range of the radar sensor may be greater than the detection range of either lidar sensor, as shown by the field of the views of the radar sensors 402A-402E extending further than the fields of view for the lidar sensors 404 and 406. Additionally, the second lidar sensor may have a detection range that is greater than the detection range of the first lidar sensor, as shown by field of view 406 extending further than field of view 404. The camera may have a detection range shown by the extent of the field of view 408. In various examples, the detection range of the camera may be greater than or less than the detection range of the other sensors.

Figure 5:
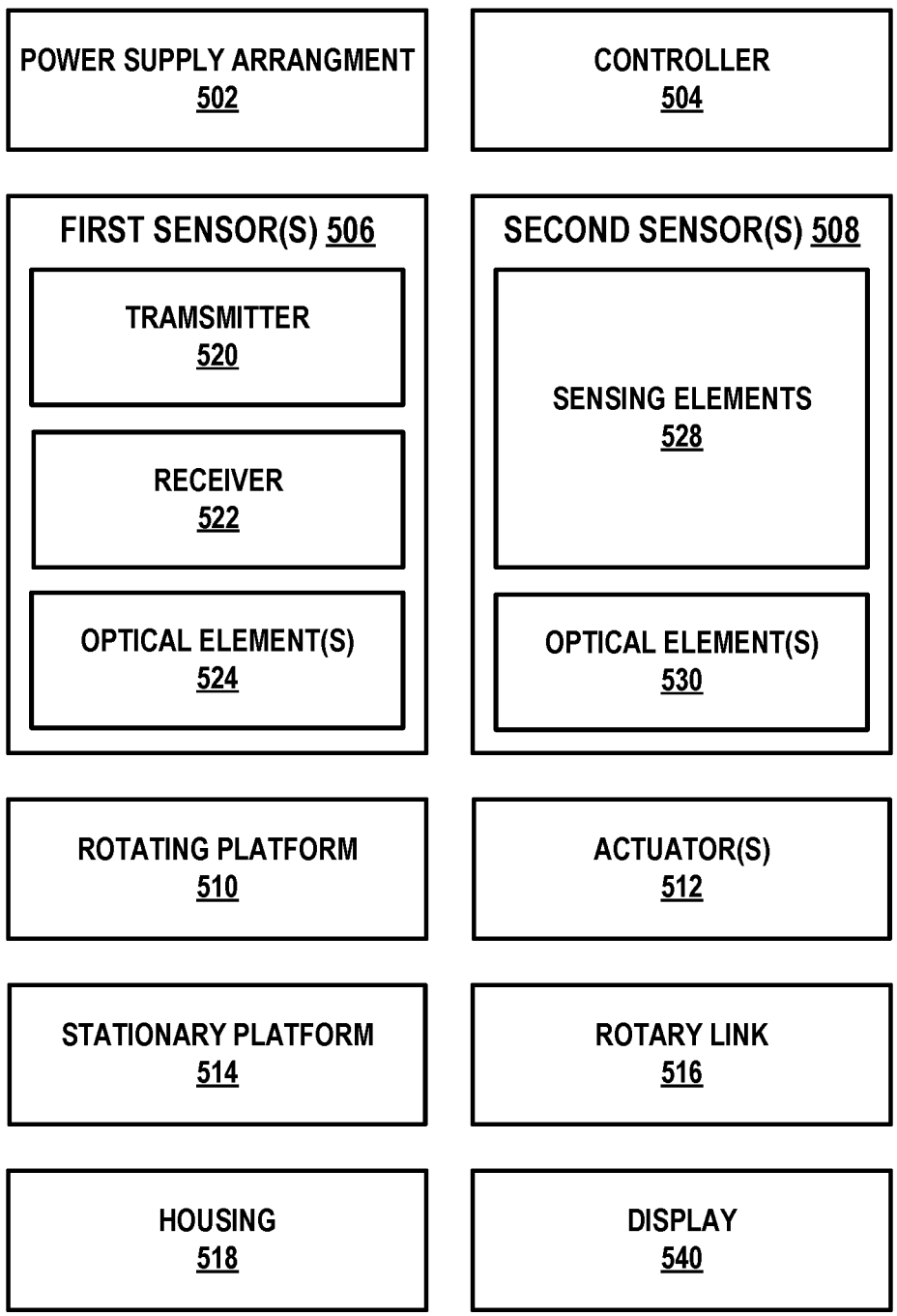
FIG. 5 illustrates a block diagram depicting components of a computing system of a vehicle, according to an example implementation.

FIG. 5 shows a simplified block diagram depicting components of an example sensor or computing system 500 of a vehicle, according to an example embodiment. The sensor system 500 may correspond to the sensor system 104 of FIG. 1 or the sensor system of FIG. 2. In some examples, the vehicle may include more than one sensor system. For example, a vehicle may include one sensor system mounted to the top of the vehicle in a sensor dome and another sensor system located in the vehicle. In other examples, the various sensor systems may be located in various different positions throughout the vehicle.

As shown, the sensor system 500 includes a power supply arrangement 502, a controller or processor 504, a first sensor 506, a second sensor 508, a rotating platform 510, one or more actuators 512, a stationary platform 514, a rotary link 516, and a housing 518. In other embodiments, the system 500 may include more, fewer, or different components. Additionally, the components shown may be combined or divided in any number of ways. For example, the first sensor 506 and/or second sensor 508 can be implemented as a single physical component. Alternatively, for example, the first sensor 506 and/or the second sensor 508 can be implemented as an arrangement of separate physical components. Thus, the functional blocks of FIG. 5 are illustrated as shown only for convenience in description. Other example components, arrangements, and/or configurations are possible as well without departing from the scope of the present disclosure.

The power supply arrangement 502 may be configured to supply, receive, and/or distribute power to various components of the sensor system 500. The power supply arrangement 502 may include or otherwise take the form of a power source (e.g., battery cells, etc.) disposed within the system 500 and connected to various components of the sensor system 500 in any suitable manner, so as to supply power to those components. Additionally or alternatively, the power supply arrangement 502 may include or otherwise take the form of a power adapter configured to receive power from one or more external power sources (e.g., from a power source arranged in a vehicle to which the sensor system 500 is mounted, etc.) and to transmit the received power to various components of the sensor system 500.

The controller 504 may be in communication with the first sensor 506 and the second sensor 508. The controller 504 may include one or more electronic components and/or circuitry configured to perform the various functions described herein. For example, the controller 504 may include one or more special purpose processors, servos, microprocessors (µP), microcontrollers (µC), digital signal processors (DSP), image processors, or any combination thereof. In some implementations, the controller 504 may include a proportional-integral-derivative (PID) controller or other control loop feedback apparatus that operates the one or more actuators 512 to modulate rotation of rotating platform 510 according to a particular frequency or phase. In some embodiments, one or more functions of the controller 504 can be performed by one or more physically separate controllers or processors that are each disposed within a respective component (e.g., the first sensor 506 and the second sensor 508, etc.) of the system 500.

The controller 504 may be configured to transmit control signals to various components of the sensor system 500 and/or to transfer data from various components of the sensor system 500 to the controller 504. Generally, the data that controller 504 receives may include sensor data based on detections or sampling of the first sensor 506 (e.g., a lidar sensor), and/or the second sensor 508 (e.g., an image sensor or a camera). In some examples, the controller 504 may perform image processing operation on the sensor data received from the first and second sensors 506 and 508. For example, the controller 504 may perform filtering, cropping, demosaicing, compression, image enhancement, or other processing of the sensor data received from the sensors 506 and 508.

The control signals sent by the controller 504 may operate various components of system 500, such as controlling light or other signals emitted by the first sensor 506 (e.g., a lidar sensor), controlling the detections of light signals by the first sensor 506, controlling image pixel capture rates or times of the second sensor 508 (e.g., an image sensor), and/or controlling the actuator 512 to rotate the rotating platform 510, among other possibilities.

To that end, in some examples, the controller 504 may include one or more processors, data storage, and program instructions (stored in the data storage) executable by the one or more processors to cause the sensor system 500 to perform the various operations described herein. In some instances, the controller 504 may communicate with an external computing device or the like (e.g., a computing system arranged in a vehicle, robot, or other mechanical device to which system 500 is mounted) so as to help facilitate transfer of control signals and/or data between the external controller and the various components of the sensor system 500.

In some examples, the controller 504 may communicate with an external computing device via a bus. The external computing device may include a vehicle-control processor, memory, communication system, and other components. The external computing device may be located in the vehicle itself, but as a separate system from the sensor system 500. In some implementations, the external computing device may be configured with a larger memory than a memory of the sensor system 500 and may be used for longer term storage and/or processing of images. For example, the sensor data stored in the external computing device may be used by a navigation system (e.g. navigation processor) of the autonomous vehicle.

The first sensor 506 of the sensor system 500 may include any device configured to scan a surrounding environment by emitting a signal and detecting reflections of the emitted signal. For instance, the first sensor 506 may include any type of active sensor. In some implementations, the first sensor 506 may include one or more sensors, such as lidar sensors, image sensors (e.g., cameras), gyroscopes, accelerometers, encoders, microphones, radar sensors, sonar sensor, thermometers, etc., that scan or image the surrounding environment of system 500.

As shown in FIG. 5, the first sensor 506 may include a transmitter 520 and a receiver 522. The transmitter 520 may be configured to transmit a signal toward an environment. For example, the transmitter 520 may include one or more light sources (not shown) that emit one or more light beams and/or pulses having wavelengths within a wavelength range. The wavelength range could, for example, be in the ultraviolet, visible, and/or infrared portions of the electromagnetic spectrum depending on the configuration of the light sources.

The receiver 522 may include one or more detectors configured to detect reflections of the signal emitted by the transmitter 520. For example, the receiver 522 may include one or more detectors (e.g., photodiodes, avalanche photodiodes, etc.) that are arranged to intercept and detect reflections of the light pulses emitted by transmitter 520 and reflected from one or more objects in a surrounding environment of system 500.

In some implementations, the first sensor 506 (e.g., in a lidar configuration) can select or adjust a horizontal scanning resolution by changing a rate of rotation of the lidar sensor and/or adjusting a pulse rate of light pulses emitted by transmitter 520. As a specific example, the transmitter 520 can be configured to emit light pulses at a pulse rate of 15,650 light pulses per second. In this example, the first sensor 506 (e.g., a lidar sensor) may be configured to rotate at 10 Hz (i.e., ten complete 360° rotations per second). As such, the receiver 522 can detect light with a 0.23° horizontal angular resolution. Further, the horizontal angular resolution of 0.23° can be adjusted by changing the rate of rotation of the lidar sensor or by adjusting the pulse rate. For instance, if the lidar sensor is instead rotated at 20 Hz, the horizontal angular resolution may become 0.46°. Alternatively, if the transmitter 520 emits the light pulses at a rate of 31,300 light pulses per second while maintaining the rate of rotation of 10 Hz, then the horizontal angular resolution may become 0.115°. Other examples are possible as well. Further, in some examples, the first sensor 506 can be alternatively configured to scan a particular range of views within less than a complete 360° rotation of the lidar sensor.

The optical elements 524 can be optionally included in or otherwise coupled to the transmitter 520 and/or the receiver 522. In one example (e.g., where the first sensor 506 includes a lidar sensor), the optical element(s) 524 can be arranged to direct light from a light source in the transmitter 520 toward the environment. In another example, the optical elements 524 can be arranged to focus and/or guide light from the environment toward the receiver 522. As such, the optical elements 524 may include any suitable combination of mirror(s), waveguide(s), light filters, lens(es), or any other optical components arranged to guide the propagation of light through physical space and/or adjust certain light characteristics. For instance, the optical elements 524 may include a light filter arranged to reduce or prevent light having wavelengths outside the wavelength range of the light emitted by the transmitter 520 from propagating toward the receiver 522. With such an arrangement for instance, the light filter can reduce noise due to background light propagating from the scanned environment and originating from an external light source different than light sources of the transmitter 520.

In a first example, where the first sensor 506 is configured as a lidar sensor, light sources of the transmitter 520 can be coupled to phased array optics (e.g., optical elements 524) that control the phase of light waves emitted by the light sources. For instance, the controller 504 can be configured to adjust the phased array optics (e.g., phased array beam steering) to change the effective pointing direction of a light signal emitted by the transmitter 520 (e.g., even if the rotating platform 510 is not rotating). In a second example, where the first sensor 506 is configured as a radar sensor, the transmitter 520 may include an array of antennas, and the controller 504 can provide respective phase-shifted control signals for each individual antenna in the array to modify a pointing direction of a combined RF signal from the array (e.g., phased array beam steering). In a third example, where the first sensor 506 is configured as a sonar sensor, the transmitter 520 may include an array of acoustic transducers, and the controller 504 can similarly operate the array of acoustic transducers (e.g., via phase-shifted control signals, etc.) to achieve a target pointing direction of a combined sound signal emitted by the array (e.g., even if the rotating platform 510 is not rotating, etc.). In other examples, the pointing direction of the first sensor 506 can be controlled using a deforming flexible structure (e.g., MEMs, etc.) that can be deformed in response to a control signal from the controller 504 to adjust a steering direction of the signals emitted by the transmitter 520. Other examples are possible.

The second sensor 508 of the sensor system 500 may include any type of sensor configured to scan or capture the surrounding environment. For example, the second sensor 508 may include an array of sensing or pixel elements (e.g., image pixel sensors) 528. In some examples, the second sensor 508 may include one or more sensors (e.g., lidar sensors, radar sensors, sonar sensor, etc.) that that scan or image the surrounding environment of the sensor system 500 (e.g., transmit signals and detect reflections thereof). Thus, although not shown, the second sensor 508 may include a transmitter and a receiver that are similar to, respectively, the transmitter 520 and the receiver 522.

In other examples, the second sensor 508 may include passive sensors (e.g., microphones, cameras, image sensors, thermometers, etc.) that detect external signals originating from one or more external sources. In some examples, the second sensor 508 may include any imaging device that detects and provides data indicative of an image. For example, the second sensor 508 may include an image sensor (e.g., a still camera, a video camera, etc.) configured to capture images of the environment in which the system 500 is located. For instance, the image sensor 528 may include one or more arrangements of light sensing elements that each provide a measure of light incident thereon. For example, the sensing elements 528 may include charge-coupled devices (CCDs), active pixel sensors, complementary metal-oxide-semiconductor (CMOS) photodetectors, N-type metal-oxide-semiconductor (NMOS) photodetectors, among other possibilities.

In some examples, the sensing elements can include multiple adjacent light detectors (or detectors of other types of signals), where each detector is configured to detect light (or other signal) having a particular wavelength or wavelength range. For instance, an image pixel of an image frame (e.g., an image) may indicate color information (e.g., RGB, RYYB, and grayscale) based on a combination of data from a first detector that detects an intensity of red light, a second detector that detects an intensity of green light, and a third detector that detects an intensity of blue light. Other examples are possible as well.

In one embodiment, the second sensor 508 may be configured to detect visible light propagating from the scene. Further, in this embodiment, the receiver 522 of the first sensor 506 (e.g., a lidar sensor) may be configured to detect invisible light (e.g., infrared, etc.) within a wavelength range of light emitted by the transmitter 520. The sensor system 500 (or the controller 504) can then combine data from the first sensor 506 (e.g., a lidar sensor) with data from the second sensor 508 (e.g., an image sensor or camera) to generate a colored three-dimensional (3D) representation (e.g., point cloud) of the scanned environment.

In some examples, the second sensor 508 may comprise a plurality of image sensors or cameras (e.g., a camera ring) disposed in a circular arrangement around an axis of rotation of the first sensor 506 (e.g., a lidar sensor). For example, a first sensor may be arranged to image a first field-of-view (FOV) of the environment that at least partially overlaps a range of pointing directions of the first sensor 506 as the first sensor 506 rotates about the axis (or as the signals transmitted by the transmitter 520 are otherwise steered to different pointing directions about the axis). Further, a second camera adjacent to and/or overlapping the first camera may image a second field of view adjacent to the first field of view of the first camera, and so on. In this way, for instance, the sensor system 500 may be configured to capture a sequence of images of the respective field of views simultaneously (and/or synchronously) with a scan of the environment by the first sensor 506 as the first sensor 506 rotates about the axis.

In some examples, where the second sensor 508 includes an image sensor, the system 500 may be configured to select the order in which the sequence of image pixels (e.g., image data) is obtained from the sensing elements 528 in a rolling shutter mode based on an order in which the transmitter 520 of the first sensor 506 is emitting light pulses (or other signals). For example, one or more rows of sensing elements in the array of sensing or pixel elements 528 may be aligned (e.g., parallel, etc.) with the axis of rotation of the first sensor 506 (e.g., a lidar sensor). For instance, if the axis of rotation of the first sensor 506 is a vertical axis, then the one or more rows may correspond to a vertical row of sensing elements (e.g., vertical linear arrangement parallel to the axis of rotation of the first sensor). Further, the transmitter 520 of the first sensor 506 may be configured to output a plurality of light beams in an arrangement of one or more vertical lines repeatedly as the first sensor 506 rotates about the axis. As such, for example, the second sensor 508 (e.g., camera(s)) may output a first row of image pixels of an image using a first row of sensing elements that are arranged similarly (e.g., vertically, etc.) to the arrangement of the plurality of light beams emitted by transmitter 520. Next, the second sensor 508 may then output a second row of image pixels using a second adjacent row of sensing elements in the direction of the rotation of the first sensor 506. Thus, for instance, the second row of image pixels may be aligned with a second vertical line of light beams emitted by the transmitter 520 of the first sensor after the first sensor 506 rotates toward the second row of sensing elements, and so on.

By scanning vertical rows of sensing elements one after another, for instance, the sequence of image pixels obtained from the second sensor 508 may include a sufficient number of pixels that were captured at times (and from viewing directions) that are similar to the times and directions of the light pulses (or other signals) emitted by the transmitter 520 of the first sensor (e.g., as the transmitter 520 rotates about a vertical axis). In other examples, if the second sensor 508 instead captured the sequence of image pixels using a first horizontal row of sensing elements followed by a second horizontal row of sensing elements and so on, then fewer image pixels may be captured at times (and from viewing directions) that are similar to the times and directions of the light pulses.

Further, each pixel or group of pixels of an image frame (e.g., an image) output by the second sensor 508 may be associated with a respective exposure time period of a corresponding sensing element or group of sensing elements to external light. By way of example, the second sensor may provide an array of adjacent rows of sensing elements 528. Further, the second sensor 508 can be configured to output a sequence of image pixels that correspond to measurements of the external light by corresponding the sensing elements in the array. For example, the second senor 508 may output a first row of image pixels of an image based on data from a first row of sensing elements in the array, followed by a second row of image pixels of the image based on data from a second adjacent row of sensing elements in the array, and so on.

In this way, the first image pixel row of an image may be associated with a first exposure time period during which the first row of sensing elements was exposed to light, the second image pixel row of the image may be associated with a second exposure time period during which the second adjacent row of sensing elements was exposed to light, etc. The first exposure time period may begin before the second exposure time period begins. For instance, after a time delay from a start time of the first exposure time period (and optionally before the first exposure time period lapses), the second sensor may start exposing the second adjacent row of sensing elements. Additionally, the first exposure time period may end before the second exposure time period ends. For instance, the controller 504 may read outputs from the first row of sensing elements after the first exposure time period ends and while the second row of sensing elements is still being exposed to the external light, and then read outputs from the second row of sensing elements after the second exposure period ends and while a third row of sensing elements is still being exposed to the external light, and so on.

Further, in some examples, image pixels (e.g., image data) from the sensing elements of the second sensor 508 can be combined according to the arrangement of the sensing elements to generate a data sensor frame (e.g., an image). In one example, data from a two-dimensional (2D) array of sensing elements may correspond to a 2D array of image pixels of the image. In another example, a 3D arrangement of sensing elements (e.g., sensing elements arranged along a curved surface) can be similarly used to generate a 2D array of image pixels of the image. Other examples are possible as well.

In some examples, the data sensor frames (e.g., images) may be captured by the second sensor 508 using a fixed or variable exposure time period. For example, the controller 504 may cause the second sensor 508 to perform a burst capture sequence to capture sensor data (e.g., images) over a specified time interval. The burst capture sequence may include a set or series of data sensor frames (e.g., image frames) of a scene captured across the same or different exposure time periods. In some examples, the controller 504 may compute or determine an amount of time for each of the exposure time periods for the burst capture sequence and may control the exposure time periods of the second sensor 508 for performing the burst capture sequence according to the exposure times.

In order to optimize a signal to noise ratio (SNR) for the burst capture sequence, the controller 504 may be configured to determine the burst capture sequence according to the following expressions:

maximize $SNR_{worst}^2$ subject to $\Sigma_{i,j} m_{ij}(t_i + t_{over}) \leq t_{max} + t_{over}$ $SNR(\Phi)^2 \geq SNR_{worst}^2$ for all $\Phi \in K$ $m_{ij} \geq 0$ and integer, In the foregoing expressions, the worst case SNR is maximized over a dynamic range $[\Phi_{min}, \Phi_{max}]$ with a given budget $t_{max}$ (overhead time $t_{over}$). Further, the burst captured sequence may contain different multiple exposures ($t_i$) and gain settings ($g_i$). As further described below, one of the data sensor frames (e.g., images) of the burst capture sequence may be selected as a base frame (e.g., a key frame) based on the smallest exposure time settings derived from above equations as further described below.

The optical elements 530 may include any combination of optical components such as lenses, mirrors, waveguides, light filters or any other type of optical component similar to the optical elements 524. Further, the optical elements 530 can be arranged to focus, direct, and/or adjust light characteristics of incident light for propagation toward the sensing elements 528. Further, where the second sensor 508 includes a plurality of image sensors or cameras, the optical elements 530 may include a plurality of respective camera lenses that focus external light onto respective image sensors of the cameras. In some examples, the optical elements 530 may include one or more light filters that selectively transmit particular wavelengths of light toward one or more particular sensing elements of the first sensor 506.

The rotating platform 510 may be configured to rotate about an axis. For example, the first sensor 506 (and/or the transmitter 520 and the receiver 522 thereof) may be supported (directly or indirectly) by the rotating platform 510 such that each of these components moves relative to the environment in response to rotation of the rotating platform 510. In particular, each of these components could be rotated (simultaneously) relative to an axis so that the first sensor 506 may obtain information from various directions. In some examples, the axis of rotation of the rotating platform 510 is vertical and a pointing direction of the first sensor 506 can be adjusted horizontally by the rotation of the rotating platform 510 about its vertical axis of rotation. The rotating platform 510 can be formed from any solid material suitable for supporting one or more components (e.g., the first sensor 506) mounted thereon.

In order to rotate the platform 510 in this manner, one or more actuators 512 may actuate the rotating platform 510. The actuators 512 may include motors, pneumatic actuators, hydraulic pistons, and/or piezoelectric actuators, among other possibilities. With this arrangement, the controller 504 could operate the actuators 512 to rotate the platform 510 in various ways so as to obtain information about the environment. In one example, the rotating platform 510 could be rotated in either direction. In another example, the rotating platform 510 may carry out complete revolutions such that the first sensor 506 (e.g., a lidar sensor) provides a 360° horizontal field of view of the environment. Moreover, the rotating platform 510 may rotate at various frequencies so as to cause the first sensor 506 to scan the environment at various refresh rates and/or scanning resolutions. Alternatively or additionally, the sensor system 500 may be configured to adjust the pointing direction of the emitted signal (emitted by the transmitter 520) in various ways. In some examples, signal sources (e.g., light sources, antennas, acoustic transducers, etc.) of the transmitter 520 can be operated according to a phased array configuration or other type of beam steering configuration.

The stationary platform 514 may take on any shape or form and may be configured for coupling to various structures, such as to a top of a vehicle for example. Also, the coupling of the stationary platform 514 may be carried out via any feasible connector arrangement (e.g., bolts and/or screws). In this way, the sensor system 500 could be coupled to a structure so as to be used for various purposes, such as those described herein. In one example, the second sensor 508 can be coupled to stationary platform 514. In this example, the second sensor 508 can remain stationary relative to the rotational motion of the first sensor 506 (or the otherwise changing beam directions of signals emitted by transmitter 520). In another example, the second sensor 508 can be mounted to another physical structure different than the stationary platform 514.

The rotary link 516 directly or indirectly couples the stationary platform 514 to the rotating platform 510. The rotary link 516 may take on any shape, form and material that provides for rotation of the rotating platform 510 about an axis relative to the stationary platform 514. In some examples, the rotary link 516 may take the form of a shaft or the like that rotates based on actuation from the actuators 512, thereby transferring mechanical forces from the actuators 512 to the rotating platform 510. In one implementation, the rotary link 516 may have a central cavity in which one or more components of the sensor system 500 may be disposed. In some examples, the rotary link 516 may also provide a communication link for transferring data and/or instructions between the stationary platform 514 and the rotating platform 510 (and/or components thereon such as the first sensor 506, etc.).

The housing 518 may take on any shape, form, and material and may be configured to house one or more components of the system 500. In one example, the housing 518 can be a dome-shaped housing. Further, in some examples, the housing 518 may be composed of a material that is at least partially non-transparent, which may allow for blocking of at least some light from entering the interior space of the housing 518 and thus help mitigate thermal and noise effects of ambient light on one or more components of the system 500. Other configurations of the housing 518 are possible as well.

In some implementations, the housing 518 may be coupled to the rotating platform 510 such that the housing 518 is configured to rotate about the above-mentioned axis based on the rotation of the rotating platform 510. In such implementations, the first sensor 506 may rotate together with the housing 518. In other implementations, the housing 518 may remain stationary while the first sensor 506 rotates within the housing 518. The sensor system 500 may also include multiple housings similar to the housing 518 for housing certain sub-systems or combinations of the components of the sensor system 500. For example, the sensor system 500 may include a first housing for the first sensor 506 and a separate housing for the second sensor 508. Other examples are possible as well.

A display 540 can optionally be included in the sensor system 500 to display information about one or more components of the system 500. For example, the controller 504 may operate the display 540 to display images captured using a camera (e.g., a first sensor 508), a representation (e.g., 3D point cloud, etc.) of an environment of the sensor system 500 indicated by lidar data from sensor 506, and/or a representation of the environment based on a combination of the data from the first sensor 506 and the second sensor 508 (e.g., colored point cloud, images with superimposed temperature indicators, etc.). The display 540 may include any type of display (e.g., liquid crystal display, LED display, cathode ray tube display, projector, etc.). Further, in some examples, the display 540 may have a graphical user interface (GUI) for displaying and/or interacting with images captured by the sensor 508, the lidar data captured using the first sensor 506, and/or any other information about the various components of the system 500 (e.g., power remaining via the power supply arrangement 502). For example, a user can manipulate the GUI to adjust a scanning configuration of the first sensor 506 and/or the second sensor 508 (e.g., scanning refresh rate, scanning resolution, etc.).

It is noted that the various components of the system 500 can be combined or separated into a wide variety of different arrangements. For example, although the first and second sensors 506 and 508 are illustrated as separate components, one or more components of first and second sensors 506 and 508 can alternatively be physically implemented within a single device. Thus, this arrangement of the system 500 is described for exemplary purposes only and is not meant to be limiting.

Figure 6:
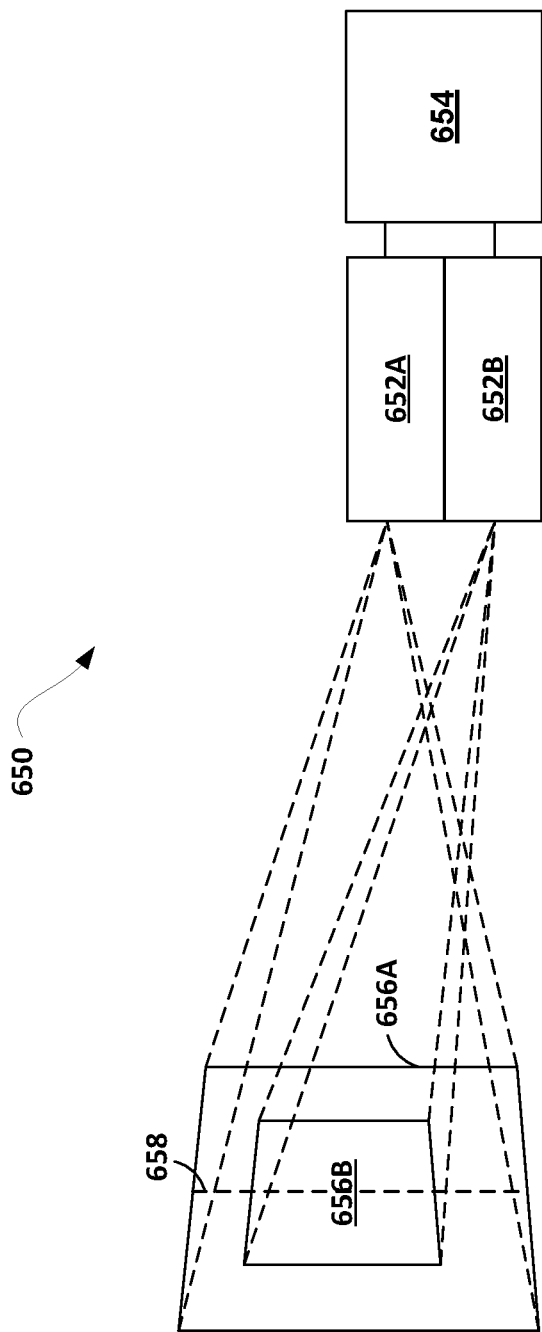
FIG. 6 is a conceptual illustration an imaging operation, according to an example implementation.

FIG. 6 is a conceptual illustration of a sensor system 650 of a vehicle having various fields of view, according to one example. The sensor system 650 may be similar to the sensor system 104 of FIG. 1, the sensor system of FIG. 2, or the sensor system 500 of FIG. 5. In this example and for purposes of illustration, the operations will be explained in reference to a sensor system 650 having a first sensor 652A and a second sensor 652B. The first sensor 652A and the second sensor 652B may be coupled to a controller or computing device 654. The controller 654 may include one or more processing units to process sensor data from the first and second sensor 652A and 652B in parallel.

As shown in FIG. 6, the first sensor 652A may have a field of view 652A and the second sensor 652B may have a field of view 656B. In some implementations, the fields of views of the sensors 652A and 652B may be different than that shown in FIG. 6. For example, the sensors 652A and 652B may have the same field of view (e.g., a common field of view) or the field of view 656A of the first sensor 652A may only partially overlap the field of view 656B of the second sensor 652B. Although the sensors 652A and 652B are shown as generally being collocated with each other, the sensors may be located on different parts of a vehicle.

Each of the first and second sensors 652A and 652B may be any type of sensor that has a field of view. For example, the sensors 652A and 652B may include lidar sensors, image sensors, cameras, infrared sensors, radar sensors, sonar sensors, microwave sensors, etc. Further, although two sensors are shown, more sensors may be used in the sensor system.

The first sensor 652A of the sensor system 650 may have a field of view 656A that includes a vertical field of view and a horizontal field of view. The first sensor 652A may be an active sensor configured to scan a field of view 656A over a scanning range. For example, the first sensor 652A may be configured to scan the field of view 656A across a range of viewing directions during a scanning time period. In one implementation, the first sensor 652A may comprise a lidar sensor and/or a laser scanner having an emitter configured to emit light signals during emissions times and a detector configured to detect reflections of the emitted light signals during detection or sampling times. The first sensor 652A may transmit one or more lines of laser pulses 658 at particular times of a scan within the field of view 656A and may receive light reflected from one or more objects in the field of view 656A. In some examples, the laser pulses 658 may not be a line of pulses, but may be one or more laser point pulses. The detector of the second sensor 652B may be sampled or scanned to capture or detect the sensor data (e.g., lidar data) associated with the reflected light signals for constructing sensor data frames (e.g., frames of lidar data). The sensor data frames may include information indicative of the environment within the field of view 652A of the first sensor 652A.

The computing device 654 of the sensor system 650 may receive sensor data frames (e.g., frames of lidar data) from the first sensor 652A and generate a three-dimensional (3D) point cloud. The 3D point cloud may include points corresponding to the light signals emitted from the first sensor 652A and reflected from the objects in the environment. Each spatial point in the point cloud can include information indicative of distances between the first sensor 652A and objects in the environment based on detections of the reflected light. Each of the spatial points in the point cloud may also include time information (e.g., timestamps) indicating the time at which the sensor data (e.g., lidar data) is captured and/or detected by the first sensor 652A. In some implementations, the computing device 654 may add the timing information to each spatial point.

As shown in FIG. 6, the second sensor 652B of the sensor system 650 may have a field of view 656B that includes a vertical field of view and a horizontal field of view. The second sensor 652B may be configured as a passive sensor that detects external light from one or more external light sources. For example, the second sensor 652B may include an image sensor (e.g., a light sensor), camera, a microphone, a thermometer, etc.

In some implementations, the second sensor 652B may be a Complementary Metal-Oxide-Semiconductor (CMOS) image sensor or other similar type of image sensor. For example, the second sensor 652B may include a two-dimensional array of sensing elements or pixels arranged in a plurality of horizontal rows and/or vertical columns. The sensing elements may receive light from the environment via an optical system (e.g., a lens) and may measure an amount of external light incident thereon during an exposure time period. The sensing elements of the second sensor 652B may be sampled or scanned to capture or detect the image data (e.g., image pixels). The sampling may be performed across at least one of the horizontal rows or vertical columns of the sensing elements of the second sensor 652B.

In one embodiment, the second sensor 652B may be configured with a rolling shutter to capture image data. The rolling shutter may sample horizontal rows or vertical columns of the sensing elements over a time period and output a sensor data frame (e.g., image frame). For example, the rolling shutter may sequentially sample one row or column of the sensing elements to create a line or row of image data. After each sensing element of a row or column has been sampled, a new row or column may be sampled. The rows and/or columns may be sampled iteratively until all the rows and columns have been sampled. In some implementations, the second sensor 652B may be configured with a global shutter that captures or samples all of the sensing elements simultaneously. The image data (e.g., image pixels) captured by the second sensor 652A may be used to form sensor data frames (e.g., image frames).

The second sensor 652B may be configured to capture images (e.g., sensor data frames) corresponding to the field of view 656B of the second sensor 652B in a time-sequential manner. Further, the second sensor 652B may capture the images at a certain number of frames per second (e.g., a particular time interval between successive images). In some implementations, the second sensor 652B may capture multiple images during a scan by the first sensor 652A.

Further, the second sensor 652B may be configured to capture images (e.g., sensor data frames) according to a plurality of parameters associated with the second sensor 652B, which may include sensitivity and/or gain settings and capture times (e.g., exposure times or shutter times). In some implementations, the second sensor 652B may capture images based on parameters that may include capture series length, capture frame rate, focus, resolution, and other relevant capture parameters. The second sensor 652B may be configured to capture images while the parameters of the second sensor 652B are changing from one image to a following image.

The controller 654 of the sensor system 650 may be configured to synchronize one or more operations of the first sensor 652A with one or more operations of the second sensor 652B. For example, the controller 654 may be configured to synchronize or align the sensor data captured by the first sensor 652A (e.g., a lidar sensor) with sensor data captured by the second sensor 652B (e.g., an image sensor). In some implementations, the sensor data may be substantially synchronized or aligned based on at least overlapping field of views and/or matching times at which sensor data is captured or detected by the sensors. The sensor system 650 may store or record the synchronized or alignment times in which the sensor data of the first sensor 652A is substantially synchronized or aligned with the sensor data of the second sensor 652B.

By synchronizing the sensor data of the sensors 652A and 652B, the sensor system 650 can improve the accuracy and/or efficiency of sensor fusion processes for mapping and/or comparing sensor data of the first sensor 652A to sensor data of the second sensor 652B. For example, the controller 654 may be configured to match one or more images (or portions of the images) captured by the second sensor 652B to corresponding data points of the point cloud captured by the first sensor 652A at substantially the same time. In some examples, an external or remote computing system may receive the sensor data from the sensors and perform the matching and/or mapping process remotely.

In some implementations, the controller 654 may synchronize one or more sampling or detection times associated with the first sensor 652A (e.g., a lidar sensor) with one or more capture times (e.g., exposure times) of the second sensor 652B (e.g., image sensor). For example, the computing device 654 may configure the second sensor 652B to perform a rolling shutter image capture of an image of a field of view during a time period in which the first sensor is sampling or detecting data of a portion of an area of interest that corresponds to a center portion of the image. As such, the capturing of the image pixels near the center portion of the image may be aligned (with respect to timing and viewing direction) with the scanning or sampling of a detector of the first sensor 652A that captures or detects reflected light signals.

In some implementations, the controller 654 of the sensor system 650 may synchronize the field of views of the first and second sensors 652A and 652B such that a field of view of the first sensor 652A (e.g., a lidar sensor) overlaps the field of view of the second sensor 652B (e.g., an image sensor) at a particular time. For example, the controller 654 may configure the first sensor 652A to scan a field of view that overlaps or corresponds to the field of view of the second sensor 652B during a time period. Further, the controller 654 may configure the first and second sensors 652A and 652B to capture sensor data when a field of view of the first sensor overlaps at least a portion of the field of view of the second sensor. In addition, the controller 654 may configure the first and second sensor to capture sensor data when a viewing direction of the first sensor 652A corresponds to a center portion of the field of view of the second sensor 652B. In some examples, the center of the field of view (e.g., scanning range) of the first sensor 652A (e.g., the 180° point of a scan from 0° to 360°, the 90° point of a scan from 0° to 180°, the 45° point of a scan from 0° to 90°, etc.) may be aligned with the center of the field of view of the second sensor 652B.

In some implementations, the controller 654 may synchronize a center region of an exposure time period (e.g., a center of a field of view) of the second sensor (e.g., image sensor) with an orientation of the first sensor 652B during detection or sampling times of the first sensor 652A. For example, the controller 654 may configure the first sensor 652A to capture sensor data at a time corresponding to a center of an exposure time of the second sensor 652B when the pointing or viewing direction of the first sensor 652A is substantially aligned with a center portion of the field of view of the second sensor. As such, the second sensor 652B (e.g., image sensor) may be configured to capture sensor data such that a particular region (e.g., center) of the sensing elements of the second sensor 652B (e.g., a vertical column or horizontal row near the center of the image sensor) is exposed to external light when an orientation (e.g., pointing or viewing direction) of the first sensor 652A (e.g., a lidar sensor) is aligned with a particular region of a scene being captured by the second sensor 652B. Further, the controller 654 may configure the first and second sensors 652A and 652B to capture sensor data when the orientation (e.g., a viewing or pointing direction) of the first sensor is substantially aligned with a center portion of the field of view associated with the second sensor.

In order to synchronize the sensor data detected or captured by the first sensor 652A with the sensor data captured by the second device 652B, the controller 654 may control and/or configure the operations and orientations associated with the first sensor 652A and/or the second sensor 652B at one or more particular times. For example, the controller 654 may configure the pointing or viewing direction of the first sensor 652A to correspond to a particular region of the field of view of the second sensor 652A during at least one scan of the first sensor 652A. Further, the controller 654 may control a rate of rotation of the first sensor 652A, a pulse rate of light signals emitted by the first sensor 652A, and/or a detection rate of emitted light signals. In some implementations, the controller 654 may provide timing signals (e.g., reference timing signals, reference clock signals, etc.) to the first sensor to control and adjust the operations of the first sensor 652A to capture sensor data.

In addition to controlling the operations of the first sensor 652A, the controller 654 may control and/or configure the operations and orientations associated with the second sensor 652B to synchronize the sensor data captured by the second sensor 652B with the sensor data captured by the first sensor 652A at one or more particular times. For example, the controller 654 may configure and/or control one or more operations of the second sensor 652B such that a center of the capture time period (e.g., exposure time periods) of the second sensor 652B corresponds to a pointing or viewing direction of the first sensor 652A during at least one scan of the first sensor 652A. For example, the controller 654 may configure the exposure time periods or other operation parameters (e.g., shutter speed) of the second sensor 652B to account for the scanning characteristics of the first sensor 652A. For instance, the controller 654 may configure the capture times of the second sensor 652B to align with corresponding sampling or detection times of the first sensor 652A at one or more particular times. As such, the viewing direction of the first sensor 652A may overlap the center of the field of view of the second sensor 652B when the first and second sensors 652A and 652B are capturing sensor data.

The controller 654 of the sensor system 650 may receive sensor data from the first and second sensors 652A and 652B in various formats (e.g., sensor data frames) and/or at different frame rates. The controller 654 may determine information about the environment, including parameters of one or more objects, using the sensor data in the sensor data frames received from the sensors 642A and 652B. For example, each sensor data frame may be indicative of the environment at a particular time period when the associated sensor captured the sensor data within the sensor data frame. Further, the sensor data frame may include one or more measurements of objects in the environment.

In some implementations, the controller 654 may receive a set of sensor data frames (e.g., image frames) with each frame including information indicating timing information, sensor information, and information indicating an order of the sensor data frames within the set. For example, the sensor data frame may include information that indicates a time of capture of the sensor data by a sensor (e.g., a timestamp) and/or information that associates the sensor data frame with a particular sensor. In some examples, the timestamps may be global timestamps. For example, the timestamps may represent global times (rather than device-specific times). In other examples, the sensor data frames may include other information as well.

The sensor data frames received from the second sensor 652B (e.g., image sensor) may have a timestamp that corresponds to a beginning, middle, or ending of an exposure time because the second sensor 652B may not capture an image at a discrete point in time. For example, the second sensor 652B may be configured to sample sensing elements of an image sensor from a top row to a bottom row. Thus, the sampling of the top row of the image sensor occurs earlier in time than a bottom row of the image sensor. In other examples, the second sensor may be configured to sample sensing elements of an image sensor from side to side (e.g., by vertical columns). As such, a timestamp may be generated that is associated with the beginning of the exposure time period, the center of the exposure time period, or the end of the exposure time period. In some examples, a timestamp may be generated that corresponds to a center exposure time based on an average of exposure times of the second sensor 654A. In other examples, the controller 654 may generate timestamps for a portion of each image (e.g., each row or column of an image sensor).

In some implementations, the controller 654 of the sensor system 650 may generate the time information (e.g., timestamps) in addition to, or in the alternative to, the timestamps generated by the sensors) and may associate the time information with the data sensor frames received from the sensors. For example, the controller 654 may generate timestamps for each sensor data frame received from the first sensor 652A (e.g., a lidar sensor) and may generate timestamps for each sensor data frame received from the second sensor 652B (e.g., an image sensor). In some examples, the controller 654 may generate timestamps for a portion of a sensor data frame (e.g., each row captured by an image sensor). In other examples, the controller 654 may generate a timestamp that corresponds to a beginning, middle, or ending of an exposure time as described above. As a result, the controller 654 may associate the sensor data of the first sensor 652A with the sensor data of the second sensor 652B based on the time information associated with the sensor data frames. For example, sensor data captured by a lidar sensor may be associated with sensor data captured by an image sensor (e.g., a camera) based on the time information associated with the sensor data (e.g., a timestamp associated with the image data and/or of lidar data).

The controller 654 of the sensor system 650 may be configured to receive a set or series of sensor data frames (e.g., a series of images) from the sensors. The series of sensor data frames may correspond to a time period during which the sensors capture the sensor data of the sensor data frames. Within the series of sensor data frames, the initial sensor data frame (e.g., initial image) may include sensor data that corresponds to the environment at a first time period. Similarly, the second sensor data frame of the set may include sensor data that corresponds to the environment at a subsequent time period after the first time period. As such, consecutive sensor data frames (e.g., images) received from a sensor may provide matching or similar information about the environment and/or may include other information depending on the amount of time that passes between the capture of the sensor data by the sensor. Thus, the controller 654 may receive measurements and other information based on previously detected objects or new objects as the vehicle continues to operate.

In some implementations, the controller 654 may perform image processing techniques that include the selection of a base or key frame (e.g., a base image) from the set or series of sensor data frames (e.g., images). The controller 654 may be configured to combine multiple data sensor frames (e.g., image frame) into a base frame (e.g., a key frame) to form a single payload image frame (e.g., an enhanced image). For example, sensor data of one or more of the sensor data frames may be extracted and combined with a base frame. As such, the series of sensor data frames may be merged or synthesized into one or more base frames to form payload image frames (e.g., output images) or a series of payload image frames.

Combining the series of sensor data frames into a payload image frame (e.g., a composite frame) using image processing techniques may improve the signal-to-noise ratio (SNR) of and achieve a high dynamic range within the resulting payload image frame (e.g., a high-dynamic range (HDR) image). Further, merging the sensor data frames may result in the payload image frame being sharper and/or better-exposed than any of the individual sensor data frames. For instance, when some of the sensor data frames are captured with the same or similar exposure time periods, these images may be merged to reduce noise in one or more sections of the base frame or other sensor data frames. When the set of sensor data frames are captured using different exposure time periods, at least some images with different exposure time periods may be merged according to HDR techniques. Thus, the controller can generate a payload image frame (e.g., image) having an improved image quality (e.g., enhanced resolution and/or digital refocusing) relative to the quality associated with a single sensor data frame.

The controller may select a base or key frame (e.g., an image) from a set of sensor data frames based on the capture or sampling times of the sensor data and the orientations of one or more of the sensors. For example, the controller 654 may be configured to select a base frame from a set of sensor data frames that is captured nearest (e.g., closest) in time to when the sensor data of the first sensor 652A is substantially synchronized or aligned with the sensor data of the second sensor 652B as described above. In other examples, the controller may select a base frame from a set of sensor data frames based on a sharpness level (e.g., greatest sharpness) and/or based on an amount of motion of an associated sensor (e.g., based on metadata associated with each of the sensor data frames).

In some implementations, the controller 654 may determine a time difference between times when the sensor data of each sensor data frame of the set was captured or detected and one or more times corresponding to the synchronization or alignment of the capture of sensor data. In some example, the controller 654 may determine the time difference by comparing the timestamps associated with each sensor data frame to one or more times (e.g., synchronization or alignment times) corresponding to the synchronized capture of sensor data by the first and second sensors 652A and 652B. Further, the controller 654 may select the base frame from the series of sensor data frames based on the time differences. For example, the controller 654 may select the base image associated with the smallest time difference. In some implementations, the computing device may compare the time difference associated with the selected base frame to a threshold. If the time difference is equal to or exceeds a threshold value, the controller 654 may discard the selected base image and select another base frame from a new set of sensor data frames.

As a result, the controller 654 may select a base frame that is captured by the second sensor 652B when the first and second sensors are detecting or sampling sensor data and the first sensor 652A has an orientation (e.g. a viewing or pointing direction) that is substantially aligned with a center of a field of view of the second sensor 652B. Further, the base frame may be half-exposed at the time when the orientation of the first sensor is aligned with the center of the field of view of the second sensor. For example, the base frame may be half exposed when half of the field of view of the second sensor 652B (e.g., image sensor) is exposed according a shutter location of the second sensor and half of the field of view remains to be exposed by the shutter of the second sensor 652B. Thus, the synchronization error between the sensor data of the first sensor 652A (e.g., a lidar sensor) and the sensor data of second sensor 652B (e.g., an image sensor) may be minimized (e.g. may be zero).

As such, the controller 654 may combine (e.g., fuse or merge) the sensor data frames received from each of the sensors based on the times that the sensors captured the sensor data frames. For example, the controller may combine the sensor data frames based on a comparison of the time stamps associated with sensor data captured by the first sensor 652A and time stamps associated with sensor data captured by the second sensor 652B.

Further, the controller 654 may be configured to update the base frame (e.g. a base image) when the vehicle moves such that new successive images no longer overlap with the original base frame. As such, the controller 654 may select a new key frame image from a series of sensor data frames to be the new key frame image. The series of sensor data frames may then be compared and/or merged with the new key frame image as described above.

In some implementations, the controller 654 may receive a series of sensor data frames (e.g., images) captured by a burst capture sequence of the second sensor 652B. For example, the controller 654 may configure the second sensor 652B to perform a burst capture sequence to generate a series of data frames (e.g., images) of a field of view of the second sensor over a specified time interval or period. The controller 654 may determine the parameters that may be required to capture the series of images of the burst capture sequence and may control the second sensor 652B according to the parameters.

The controller may select a base frame from the series of sensor data frames of the burst capture sequence as described above. Further, the controller may select the base frame based on the exposure times periods of the burst capture sequence. For example, in order to optimize a signal to noise ratio (SNR) for a burst capture sequence, the controller 654 may determine the exposure times periods (e.g., capture time period) for the second sensor 652B to capture a series of images during a burst capture sequence. In some implementations, the second sensor 652B may use the same or fixed exposure time periods to capture the series of images for the burst capture sequence. In other implementations, the second sensor 652b may use different or variable exposure time periods to capture the series of images. The controller 654 may be configured to select the base image from the series of images based on the smallest exposure time period to perform the burst capture sequence based on the expressions described above.

Further, the controller 654 may determine one or more characteristics of the environment based on the series of images (e.g., sensor data frames) of the burst capture sequence so that subsequent burst capture sequences performed by the second sensor 652B may be optimized. For example, the series of images of the burst capture sequence may provide parameters for the second sensor 652B to use in subsequent burst capture sequences for capturing a series of images. As such, the controller 654 may use the characteristics and parameters associated with the series of images (e.g., sensor data frames) to configure the second sensor 652B generate a subsequent burst capture sequence.

In some implementations, the systems of the vehicle may utilize resulting payload image frames or images) as input to control the path of the vehicle in an environment and/or to make a determination about the location and identity of objects in the surrounding environment. For example, the vehicle system may compare a series of captured images with the payload image frames to determine changes in positions of the vehicle. By utilizing the payload image frames, the system may make estimates of the position of the vehicle that are bounded in error, from payload image frame to payload image frame. Further, the payload image frames may be useful for a number of applications including depth estimation, three-dimensional reconstruction, refocusing, high dynamic range imaging, and the like.

Figure 7:
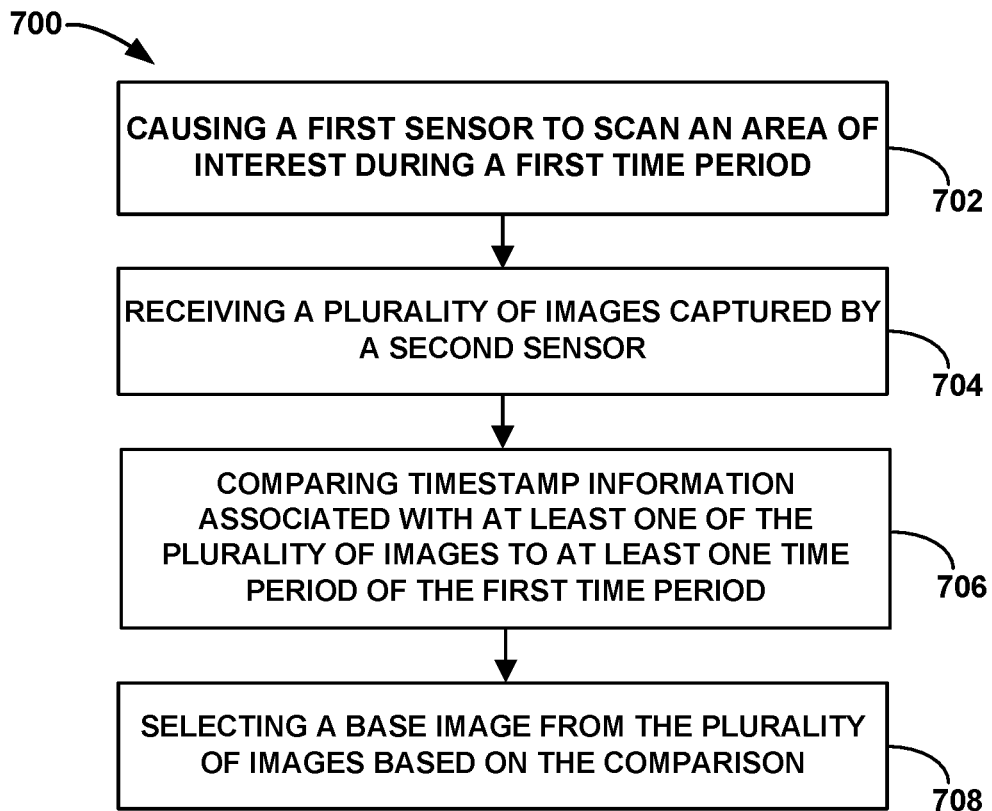
FIG. 7 is a flow chart of a method, according to an example implementation.

FIG. 7 is a flow chart of a method 700 for generating enhanced images (e.g., image frame), according to an example implementation. The method 700 represents an example method that may include one or more operations as depicted by one or more blocks 702-708, each of which may be carried out by any of the systems shown in FIGS. 1-6, among other possible systems. In an example implementation, a computing system or a sensor system (e.g., an image captured device, a sensor system 104, a control system 106, remote computing system 302 or server computing system 306) performs the illustrated operations, although in other implementations, one or more other systems can perform some or all of the operations.

Those skilled in the art will understand that the flow charts described herein illustrates functionality and operations of certain implementations of the present disclosure. In this regard, each block of the flowcharts may represent a module, a segment, or a portion of program code, which includes one or more instructions executable by one or more processors for implementing specific logical functions or steps in the processes. The program code may be stored on any type of computer readable medium, for example, such as a storage device including a disk or hard drive. In addition, each block may represent circuitry that is wired to perform the specific logical functions in the processes. Alternative implementations are included within the scope of the example implementations of the present application in which functions may be executed out of order from that shown or discussed, including substantially concurrent or in reverse order, depending on the functionality involved, as would be understood by those reasonably skilled in the art. Within examples, any system may cause another system to perform one or more of the operations (or portions of the operations) described below.

At block 702, the method 700 involves causing a first sensor to scan an area of interest during a first time period. The first sensor of a sensor system may be configured to scan or capture a scene of the environment. In one implementation, the first sensor (e.g., first sensor 652A of FIG. 6) may be configured to scan or capture a field-of-view (FOV) defined by a range of pointing or viewing directions associated with the first sensor. The first sensor can be configured to perform a plurality of scans of the field of view across a scanning range by rotating back and forth between the pointing directions (e.g., sweep back and forth between two pointing directions). In other examples, the first sensor can be configured to rotate one complete rotation about an axis to perform scans across a scanning range of 360°.

In one implementation, the first sensor may be configured as an active sensor that emits a signal at a source wavelength (e.g., infrared signal, etc.) to illuminate a scene, and then detects reflections of the emitted signal to scan the scene. In one example, the first sensor may be mounted on a rotating platform that rotates about an axis to adjust a pointing direction of the first sensor. While rotating, the first sensor may emit one or more light beams or pulses toward the field-of-view and then detect reflections of the emitted light. The sensor system may process the detected reflections (e.g., via a computing device) to determine information (e.g., distance, texture, material, etc.) about one or more objects in the field of view of the first sensor.

In some examples, the first sensor may be mounted to a vehicle at any suitable mounting position (e.g., on the top side of the vehicle). In some examples, the first sensor may be a lidar sensor. In other examples, the first sensor may be any suitable type of sensor (e.g., a radar sensor, a camera, a sonar sensor, etc.) that emits and/or detects signals (e.g., radio waves, sound waves, etc.).

At block 704, the method 700 involves receiving a plurality of images captured by a second sensor. The second sensor (e.g., second sensor 652B of FIG. 6) of the sensor system may be configured to capture images of a field of view associated with the second sensor. The field of view of the second sensor may overlap the field of view of the first sensor. In some implementations, the field of view of the second sensor (scanned by the second sensor of the sensor system) may correspond to the region associated which partially overlaps the field of view of the first sensor. In some implementations, the field of view of the second sensor may be included within the scanning range of the first sensor.

The second sensor of the system may be configured to capture images by detecting external light originating from one or more external light sources in the field of view of the second sensor. For example, the second sensor may have an array of sensing or pixel elements (e.g., image sensor) arranged in a plurality of horizontal rows and vertical columns. A first row or column of the sensing elements may detect light from a first portion of a field of view of the first sensor, a second row or column adjacent to the first row may detect light from a second portion of the field of view adjacent to the first portion, and so on. Further, in this example, the second sensor may be operated in a rolling shutter mode configuration to generate an image of the scene by first measuring the outputs of the first row or column, then the outputs of the second row or column, and so on as further described above.

The second sensor may be mounted at any suitable position on the vehicle (e.g., on the front side of the vehicle). In some implementations, the second sensor may be mounted in close proximity to the mounting position of the first sensor on the vehicle. In some examples, the second sensor may be an image sensor or a camera. In other examples, the first sensor may be any suitable type of sensor that captures sensor data.

In some implementations, the computing device may be configured to synchronize one or more detection and/or sampling times during a scan by the first sensor with one or more capture times (e.g., exposure times) of the second sensor (e.g., an image sensor). For example, the second sensor can be configured to capture images according to detection or capture times of light signals or pulses associated with the first sensor (e.g., a lidar sensor). In one implementation, the computing device can cause the second sensor (e.g., image sensor) to capture sensor data such that a particular region (e.g., center) of the sensing elements of the second sensor (e.g., a vertical column or horizontal row near the center of the image sensor) is exposed to external light when the pointing direction of the first sensor (e.g., a lidar sensor) is aligned with the particular region (e.g., center) of the image and/or the field of view of the second sensor. As such, the image pixels near the particular region (e.g., center) of the image or frame (e.g., captured using the center vertical or horizontal row of an image sensor) may be substantially aligned (with respect to timing and viewing direction) with the light pulses of the first sensor that were detected or captured when these image pixels were measured.

In order to align or synchronize the capture of sensor data by the first sensor and second sensors, the computing device may be configured to operate the first and second sensors according to timing information. For example, when configuring the second sensor to capture an image, the computing device may determine a timing configuration for operating the second sensor based on at least one or more rotation characteristics of the first sensor (and/or an arrangement of light beams directed by the first sensor toward the environment). As such, the second sensor may obtain an image by sampling the sensing elements of the image sensor in a particular order based on the arrangement of the plurality of light beams captured or detected by the first sensor. For example, the computing device may be configured to trigger exposure of the second sensor (e.g., image sensor) such that the center of the exposure time period of second sensor is synchronized with the time at which the orientation (e.g., viewing or pointing direction) of the first sensor (e.g., a lidar sensor) overlaps the center of the image. Further, in this example, the computing device may configure the second sensor to capture an image such that a center of the exposure time period of the second sensor corresponds to a particular time when first sensor (e.g., lidar sensor) is pointing toward a center of the field of view of second sensor. Thus, in this example, each row of the sensing elements (e.g., image pixels sensors) of the second sensor (e.g., image sensor) may correspond to a respective pointing direction of the range of pointing directions associated with the first sensor that together define the scanning range of the first sensor. Other examples are possible as well.

In some implementations, the computing device may determine a start time of an exposure time period (e.g., capture period) of the second sensor based on a time associated with a pointing direction of the first sensor being in a particular orientation about the axis of rotation. In some examples, the particular orientation may define a particular field of view (e.g., a portion of the field of view) of the first sensor that at least partially overlaps a region of the environment represented in a portion of the image captured using the second sensor (e.g., center region of an image sensor, etc.) In some implementations, the computing device may determine a start time for the first exposure period of the sensing elements based on one or more emission times of one or more light pulses (or beams) emitted by the first sensor or detection or capture times of the light pulses, and operating the second sensor based on the determined start time. For example, the computing device may select the exposure time periods of the second sensor based on the emission or detection times of the first sensor and the pointing direction of the first sensor when emitting the respective light beams or detected the light beams. Further, the computing device may also determine an exposure time period of the second sensor based on a rate of rotation of the first sensor and adjust the exposure time period of the second sensor based on the rotation rate.

In other implementations, the computing device may be configured to adjust or modify one or more rotation characteristics of the first sensor based on the exposure time period of the second sensor. For example, the second sensor can be operated to capture images using an image sensor in a particular rolling shutter configuration that defines the order for scanning or sampling the sensing elements of the image sensor. In this example, the computing device may operate the first sensor to emit or detect light beams in an order and arrangement that matches the order and arrangement of the image pixels measured by the second sensor. As another example, the computing device may adjust the frequency of rotation of the first sensor according to the time delay between the measurement of image pixels associated with the first row and the measurement of image pixels associated with a second row that includes sensing elements.

In some implementations, the computing device may use timing signals (e.g., reference timing signals, reference clock signals, etc.) to control and adjust the operations of the first and second sensor. For example, the computing device may send timing signals to the first sensor to control the pointing directions of the first sensors. For instance, the sensor system can generate reference clock signals and then provide the reference timing signals to a controller of the first sensor and/or a controller of the second sensor. Thus, in this example, a sensor system can generate a reference timing signal internally for synchronizing the operations and/or orientations of the first and second sensors.

At block 706, the method 700 involves comparing the timestamp information of one or more of the plurality of images to at least one time of the first time period. The computing device of the sensor system may be configured to receive a set or series of images (e.g., sensor data frames or image frames) from one or more sensors. The images may include information indicating time information (e.g., a timestamp), sensor information, and information indicating an order of the images within a set of images. For example, an image may include information that indicates the time of capture of the image (e.g., an image frame) by a sensor and/or information that associates the image with a particular sensor.

In some implementations, the computing device may generate time information (e.g., timestamps) in addition to, or as an alternative to, the timestamps generated by the sensors and may associate the time information with the images received from one or more sensors. In some examples, the timestamps may be associated with a portion of an image (e.g., a portion of an image frame) captured by a sensor (e.g., each row or column of an image sensor). Further, the timestamps may correspond to a beginning, middle, or ending of an exposure time associated with an image or the second sensor.

In some implementations, the computing device may select a base or key image (e.g., an image frame) from a set of images (e.g., image frames) based on the capture or sampling times of sensor data and/or the orientations of one or more sensors. For example, the computing device may be configured to select a base image from a set of images that is captured nearest (e.g., closest) in time to when the sensor data of the base image is substantially synchronized or aligned with sensor data of another sensor (e.g., when the sensor data of the second sensor 652B is substantially synchronized or aligned with the sensor data of the first sensor 652A of FIG. 6).

In some implementations, the computing device may determine time differences between the time when the sensor data of each image (e.g., each sensor data frame) of the set was captured or detected and one or more times corresponding to the synchronization or alignment of capturing sensor data. In some example, the computing device may determine time differences by comparing the timestamps associated with each image (e.g., each sensor data frame) to one or more times (e.g., synchronization or alignment times) corresponding to the synchronization or alignment of capturing of sensor data by at least two sensors of a sensor system (e.g., the first and second sensors 652A and 652B of FIG. 6).

At block 708, the method 700 involves selecting, by the computing device, a base image from the plurality of images based on the comparison. The computing device may select the base image (e.g., a base frame) from the series of images (e.g., a series of sensor data frames) based on comparing timestamps associated with each image (e.g., each sensor data frame) and one or more synchronization or alignment times. In some implementations, the computing device may select the base image based on the smallest of the time differences of the comparisons. In some implementations, the computing device may compare the time difference associated with a selected base frame to a threshold. If the time difference is equal to or exceeds a threshold value, the computing device may discard the selected base image and select another base frame from a new set of images (e.g., sensor data frames).

Figure 8:
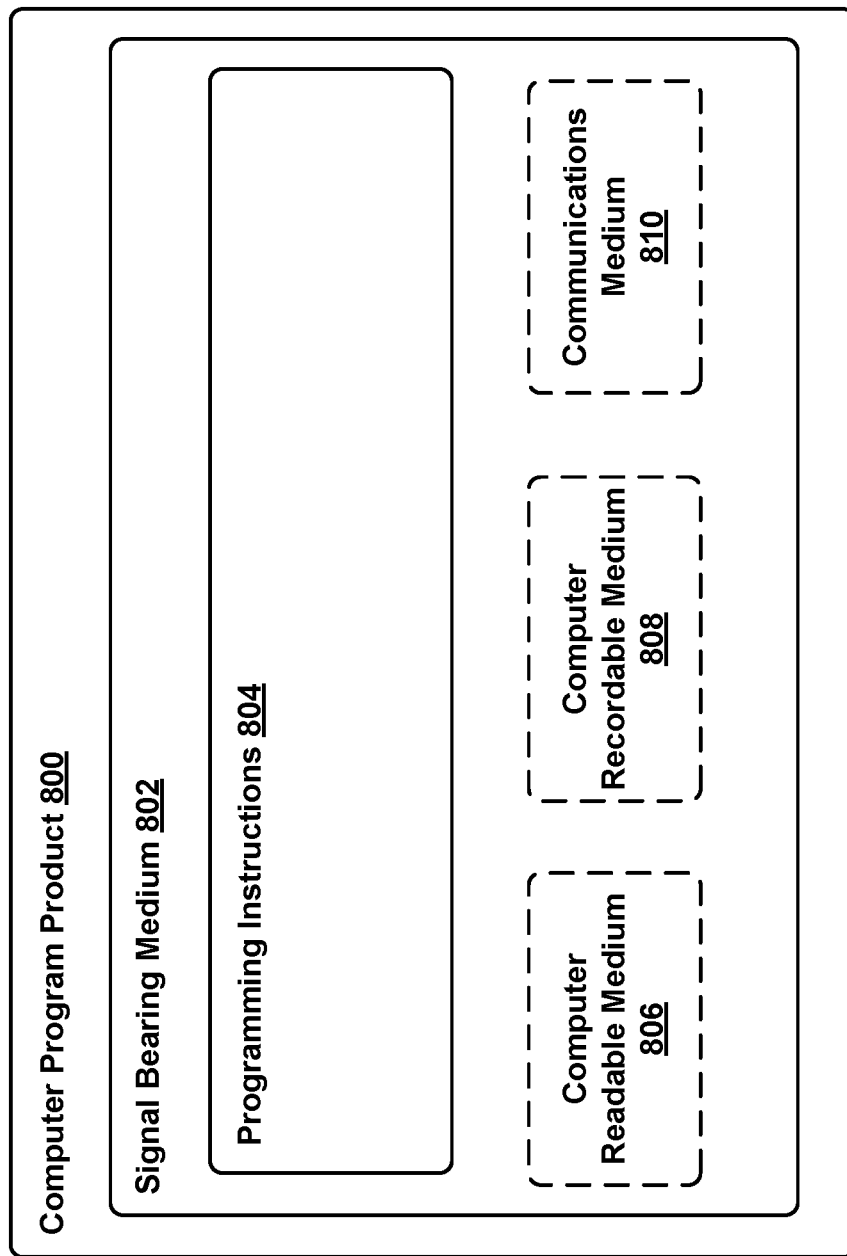
FIG. 8 is a schematic diagram of a computer program, according to an example implementation.

FIG. 8 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In an example implementation, computer program product 800 is provided using signal bearing medium 802, which may include one or more programming instructions 804 that, when executed by one or more processors may provide functionality or portions of the functionality described above with respect to FIGS. 1-7. In some examples, the signal bearing medium 802 may encompass a non-transitory computer-readable medium 806, such as, but not limited to, a hard disk drive, a CD, a DVD, a digital tape, memory, components to store remotely (e.g., on the cloud) etc. In some implementations, the signal bearing medium 802 may encompass a computer recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Similarly, the signal bearing medium 802 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 802 may be conveyed by a wireless form of the communications medium 810.

The one or more programming instructions 804 may be, for example, computer executable and/or logic implemented instructions. In some examples, a computing device such as the computer system 112 of FIG. 1 or remote computing system 302 and perhaps server computing systems of FIG. 3 may be configured to provide various operations, functions, or actions in response to the programming instructions 804 conveyed to the computer system 112 by one or more of the computer readable medium 806, the computer recordable medium 808, and/or the communications medium 810.

The non-transitory computer readable medium could also be distributed among multiple data storage elements and/or cloud (e.g., remotely), which could be remotely located from each other. The computing device that executes some or all of the stored instructions could be a vehicle, such as vehicle 200 illustrated in FIG. 2. Alternatively, the computing device that executes some or all of the stored instructions could be another computing device, such as a server.

The above detailed description describes various features and operations of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
   causing a first sensor to perform a scan of a first field of view (FOV), wherein the scan of the first FOV involves adjusting a pointing direction of the first sensor during a period of time;
   receiving a plurality of images captured by a second sensor during the period of time, wherein the second sensor has a second FOV, and wherein each image of the plurality of images is captured during a respective exposure time period;
   selecting, from among the plurality of images, a base image having an exposure time period during which the pointing direction of the first sensor is aligned with a particular region of the second FOV; and
   combining the base image with at least one other image of the plurality of images to form a payload image.

2. The method of claim 1, wherein the particular region of the second FOV is a center of the second FOV.

3. The method of claim 1, further comprising:
   controlling a vehicle based on the payload image.

4. The method of claim 1, wherein the first sensor comprises an active sensor.

5. The method of claim 4, wherein the active sensor is a light detection and ranging (lidar) sensor.

6. The method of claim 1, wherein the second sensor comprises a camera.

7. The method of claim 1, wherein the first sensor comprises a transmitter configured to emit a light signal.

8. The method of claim 7, wherein adjusting the pointing direction of the first sensor during the period of time comprises:

optically changing a direction of the light signal emitted by the transmitter.

9. The method of claim 7, wherein adjusting the pointing direction of the first sensor during the period of time comprises:

rotating the transmitter.

10. The method of claim 1, wherein the payload image has an improved quality relative to the base image.

11. The method of claim 1, wherein the first FOV is different than the second FOV.

12. A system comprising:

a first sensor configured to perform a scan of a first field of view (FOV), wherein the scan of the first FOV involves adjusting a pointing direction of the first sensor during a period of time;

a second sensor configured to capture a plurality of images during the period of time, wherein the second sensor has a second FOV, and wherein each image of the plurality of images is captured during a respective exposure time period; and a controller configured to:

receive the plurality of images captured by the second sensor during the period of time;

select, from among the plurality of images, a base image having an exposure time period during which the pointing direction of the first sensor is aligned with a particular region of the second FOV; and combine the base image with at least one other image of the plurality of images to form a payload image.

13. The system of claim 12, wherein the particular region of the second FOV is a center of the second FOV.

14. The system of claim 12, wherein the controller is further configured to:

control a vehicle based on the payload image.

15. The system of claim 12, wherein the first sensor is an active sensor.

16. The system of claim 15, wherein the active sensor is a light detection and ranging (lidar) sensor.

17. The system of claim 12, wherein the second sensor comprises a camera.

18. The system of claim 12, wherein the payload image has an improved quality relative to the base image.

19. The system of claim 12, wherein the first FOV is different than the second FOV.

20. A non-transitory computer-readable medium storing instructions, the instructions being executable by one or more processors to perform operations comprising:

causing a first sensor to perform a scan of a first field of view (FOV), wherein the scan of the first FOV involves adjusting a pointing direction of the first sensor during a period of time;

receiving a plurality of images captured by a second sensor during the period of time, wherein the second sensor has a second FOV, and wherein each image of the plurality of images is captured during a respective exposure time period;

selecting, from among the plurality of images, a base image having an exposure time period during which the pointing direction of the first sensor is aligned with a particular region of the second FOV; and combining the base image with at least one other image of the plurality of images to form a payload image.

21. The non-transitory computer-readable medium of claim 20, wherein the particular region of the second FOV is a center of the second FOV.

* * * * *